United States Patent
Coric

(10) Patent No.: US 7,408,735 B1
(45) Date of Patent: Aug. 5, 2008

(54) DATA TRACKING METHOD AND APPARATUS FOR DISK-BASED DATA STORAGE

(75) Inventor: Zoran Coric, Framingham, MA (US)

(73) Assignee: Maxtor Corporation, Scotts Valley, CA (US)

( * ) Notice: Subject to any disclaimer, the term of this patent is extended or adjusted under 35 U.S.C. 154(b) by 543 days.

(21) Appl. No.: 10/778,001

(22) Filed: Feb. 11, 2004

Related U.S. Application Data

(60) Provisional application No. 60/446,595, filed on Feb. 11, 2003.

(51) Int. Cl.
 G11B 5/596 (2006.01)
 G11B 27/36 (2006.01)
(52) U.S. Cl. .................... 360/77.04; 360/77.07; 360/31
(58) Field of Classification Search ........................ None
 See application file for complete search history.

(56) References Cited

U.S. PATENT DOCUMENTS

| | | | |
|---|---|---|---|
| 5,793,559 A | 8/1998 | Shepherd et al. | 360/78.09 |
| 6,115,203 A | 9/2000 | Ho et al. | 360/77.04 |
| 6,369,974 B1 * | 4/2002 | Asgari et al. | 360/78.14 |
| 6,476,989 B1 * | 11/2002 | Chainer et al. | 360/31 |
| 6,549,362 B1 | 4/2003 | Melrose et al. | 360/77.04 |

OTHER PUBLICATIONS

U.S. Appl. No. 10/318,316, filed Dec. 11, 2002, Hargarten et al.

* cited by examiner

*Primary Examiner*—Jason C Olson
(74) *Attorney, Agent, or Firm*—Fellers, Snider, et al.

(57) ABSTRACT

A method and apparatus for dealing with undesired deviations of servo burst component magnitudes, as compared with nominal magnitudes, is provided. Inaccurate servo burst magnitudes can arise from components which are misplaced, often from an inaccuracy in a trimming operation. In one aspect, a value indicative of the shift of a component null point is measured and used to calculate a burst amplitude correction factor. Knowledge of system dynamics can be used to calculate a track shape that can be used in calculating the correction factor. Values indicative of track shape can be related to transfer functions of the disk drive controller and plant. In one embodiment, information indicative of repeatable runout is convolved with a function of the transfer function of the controller and plant, and the result is used for calculating a burst component amplitude correction value.

43 Claims, 24 Drawing Sheets

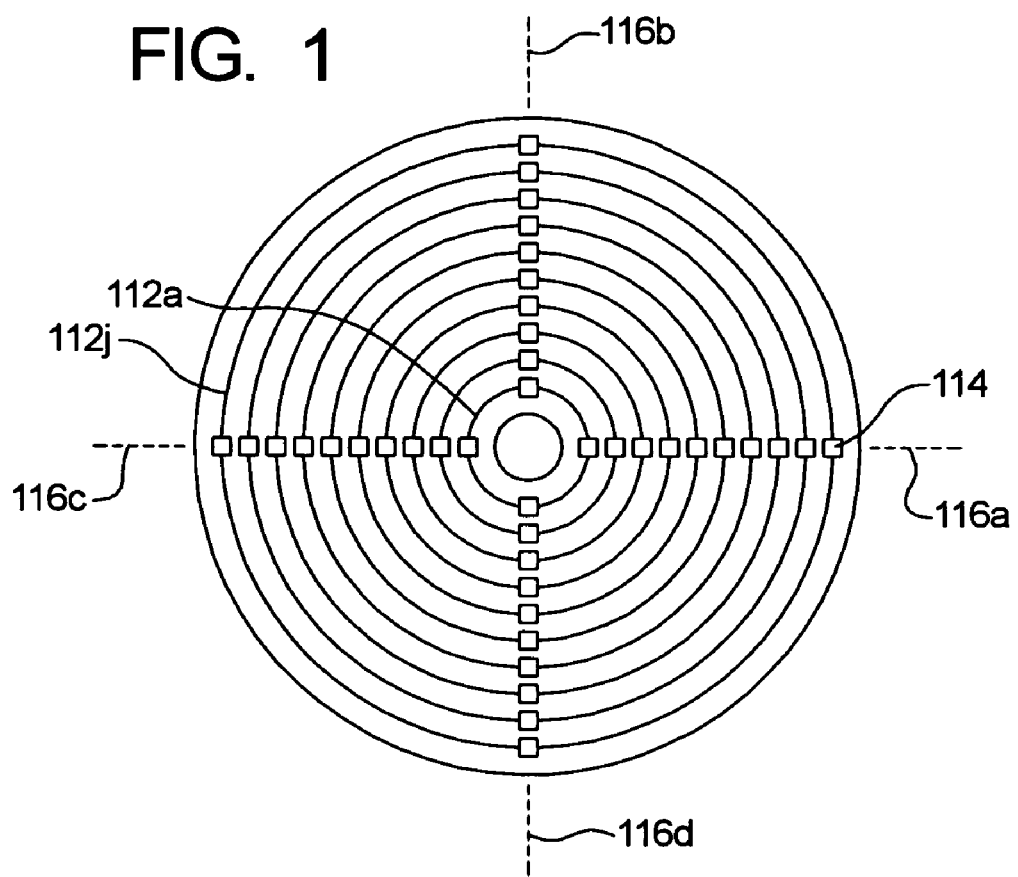

PHYSICAL POSITION IN NOMINAL
SERVO TRACK UNITS →

PHYSICAL POSITION IN NOMINAL SERVO TRACK UNITS →

PHYSICAL POSITION IN NOMINAL SERVO TRACK UNITS →

DATA TRACKING METHOD AND APPARATUS FOR DISK-BASED DATA STORAGE

CROSS-REFERENCE TO RELATED APPLICATIONS

Priority is claimed from U.S. Provisional Patent Application Ser. No. 60/446,595 filed Feb. 11, 2003, which is incorporated herein in its entirety.

TECHNICAL FIELD

The present invention relates to data tracking in a hard disk drive or other disk-based data storage system. In particular, the present invention relates to avoiding instabilities (or other undesired effects) in a tracking servo system including those that can arise from misplaced or distorted servo burst components.

BACKGROUND INFORMATION

In a disk-based data storage device, such as a hard disk drive, data is typically recorded to and read from a plurality of data tracks. Generally, the "nominal" (i.e., desired or ideal) track shape is circular, and "nominal" tracks are concentric about the disk axis of rotation.

Typically, as part of a manufacturing or setup procedure (prior to normal use for data read/write), a hard disk drive is provided with a plurality of servo "bursts." The purpose of these bursts is to provide location information to components of the head-positioning system, typically a servo-type control system, which can allow the servo system to maintain the read/write head at a desired radial position as the disk rotates, i.e., to "follow" a desired data track. Although the present invention can be used in connection with any of a number of servo burst systems, those with skill in the art will understand how to use the present invention using any of a number of servo burst systems based on a description of a particular servo burst configuration. In this configuration, a plurality of servo bursts is positioned around the track. Typically, the bursts are circumferentially aligned, from one track to the next, defining a plurality of radial "spokes."

In one particular servo burst configuration, for each track, or group of tracks, each spoke contains four bursts (plus other information such as track number, etc). For purposes of the present disclosure, these four bursts will be referred to as A, B, C and D burst components. Each component has a nominal radial width of one track width, with the components being configured such that two of the components (e.g., the "A" and "B") components have their "radial" midlines aligned with the nominal track centers and the other components (e.g., "C" and "D") have their nominal edges aligned with the track centers. As the servo bursts pass under the read head, each component will result in a detected signal with a magnitude between minimum and maximum values and, accordingly, four signal amplitudes A, B, C, and D will be obtained. If the servo burst components are positioned substantially so as to define concentric and equidistant tracks, and have substantially their nominal sizes and shapes, the relative magnitudes of the servo burst signals A, B, C, and D will be indicative of whether the read head is at the nominal track center and, if not, the four magnitudes can be used to compute a position error signal (PES). In practice, the position of the burst components has repeatable and nonrepeatable components. Non-repeatability of the burst positioning results in irregular burst shapes and sizes. If all bursts are the same size and shape but their positions are such that all tracks are concentric and equidistant although non-circular then there will be repeatable run out but no instability. The position error signal, typically with, some correction or manipulation, including as described below, can be used as an input to the tracking servo system in a manner so as to drive the read head toward the desired radial position and, thus, achieve the desired tracking.

When the servo bursts are written on the disk, typically using a servo writing apparatus and procedure, it is possible that the servo burst components may sometimes have a size, shape or position which departs from the desired concentric, equidistant configuration. If the deviations are relatively small (e.g., typically no more than about +/−0.07 of the track width), it is possible, in general, to use the PES signal to provide a feed forward control input to the servo system that can reduce or eliminate (typically higher-frequency) recurring tracking deviations (repeatable run out) to achieve a certain degree of improvement in track positioning. Theoretically, all frequency harmonics of the repeatable run out can be eliminated but various environmental changes like temperature and disk slip make the first few harmonics change so that one-time correction for these is not effective. However, for larger-magnitude deviations of burst component shape, size or position, non-linearalities are introduced during track position detection (TPD) which become significant enough that instability is created in the servo loop which may render the track unusable for reading and writing. When a track of this type is detected, it is typically mapped out from the drive format (tagged as unusable). If there are more than a threshold number of tracks which are mapped out (typically a few tenths of a percent), the entire drive may be considered unusable.

Although previous methods did not adequately deal with seriously-distorted servo burst components, it is believed that it was often a sufficiently infrequent occurrence and that it was not considered a substantial problem in the industry. The present invention, however, addresses this issue of burst component distortion at least partially because of a recognition that as data density increases, and track width decreases, the percentage of track width that a given absolute amount of burst component distortion represents will also increase. Accordingly, it would be useful to provide a method and apparatus which can effectively deal with burst component distortions that might otherwise cause servo instability, or, in some other way, contribute to undesired mapping out of data tracks or unusability of disk drives. It would be particularly useful to provide a method and apparatus for dealing with distorted servo burst components which can be implemented in a relatively straightforward fashion, preferably being capable of implementation substantially by changes in software.

SUMMARY OF THE INVENTION

The present invention includes a recognition and/or application of the existence, source, and/or nature of problems in previous approaches, including those described herein.

According to one embodiment of the invention, a servo tracking system, rather than being provided only with the first component amplitudes A, B, C, and D are provided with corrected amplitudes $A_{corrected}$, $B_{corrected}$, $C_{corrected}$, and $D_{corrected}$. The corrections are calculated to take into account any servo burst distortions (changes in servo burst component size, shape and/or position) compared to the nominal burst component size, shape and position. Preferably, the corrections not only reduce or eliminate repeatable runout, but also reduce or eliminate instability in the servo system arising from such servo burst component distortions, which might otherwise reduce the number of usable tracks or cause a disk drive to be considered unusable.

In one embodiment, correction values are computed which are indicative of, or otherwise related to, a servo burst component shift (i.e., a measure of the amount by which the circumferential boundary defining the edges of (radially) adjacent burst components, deviates from the desired concentric and equidistant configuration).

According to one embodiment, the correction values are obtained using information indicative of the dynamics of the servo system or its components. In one embodiment, the correction uses a value based on the transfer functions of the servo system controller and plant (which may be obtained, e.g., using Bode plot data for the track-following servo controller and plant). In one embodiment, servo component shift is related to a circular convolution of a repeatable runout with a function of the servo controller and plant transfer functions. The correction values may be taken as proportional to burst component shift or may be, e.g., a higher order function (such as fourth order function of the shift, and using knowledge of the destination location relative to the nominal burst boundaries (null points)).

According to one embodiment of the invention, a method and apparatus for dealing with undesired deviations of servo burst component magnitudes, as compared with nominal magnitudes, is provided. Inaccurate servo burst magnitudes can arise from components which are misplaced, often from an inaccuracy in a trimming operation. In one aspect, a value indicative of the shift of a component null point is measured and used to calculate a burst amplitude correction factor. Knowledge of system dynamics can be used to calculate a track shape that can be used in calculating the correction factor. Values indicative of track shape can be related to transfer functions of the disk drive controller and plant. In one aspect, information indicative of repeatable runout is convolved with a function of the transfer function of the controller and plant, and the result is used for calculating a burst component amplitude correction value.

BRIEF DESCRIPTION OF THE DRAWINGS

FIG. 1 is a partial simplified plan view of a plurality of data tracks of a disk drive of a type that can be used in accordance with an embodiment of the present invention;

DETAILED DESCRIPTION OF THE PREFERRED EMBODIMENT

As illustrated in the simplified view of FIG. 1, each of the plurality of nominally circular and concentric data tracks 112a, 112j includes a plurality of servo sectors having a plurality of servo bursts therein, e.g., 114, which are circumferentially aligned to define radial spokes 116a, 116b, 116c, 116d. Although the simplified view of FIG. 1 shows only ten data tracks and four spokes, the typical disk drive will contain thousands of tracks and many more spokes.

Figure 2A:
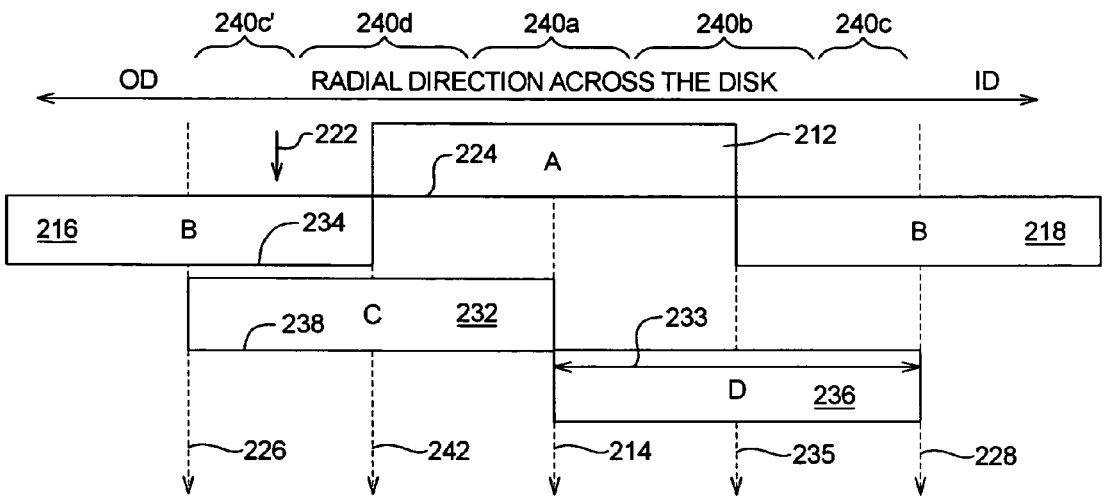
FIG. 2A is a plan view, in simplified form, of the layout of four servo bursts according a servo scheme, with the horizontal direction corresponding to the radial direction of the disk, that can be used in accordance with an embodiment of the present invention.

FIG. 2A illustrates, in simplified form, the layout of servo bursts according a servo scheme that can be used in accordance with an embodiment of the present invention. In the illustrated scheme, the servo bursts include an A burst component 212 positioned symmetrically about a nominal track midline 214, two B burst components 216, 218 positioned trackwise "after" (i.e., downtrack in direction of arrow 222) the trackwise "lower" boundary 224 of the A burst and positioned radially symmetrically about the next outer (toward the outer diameter) track 226 and next inner track 228, a C component 232 positioned trackwise after the lower boundary 234 of the B components and positioned radially to be symmetric about a line midway between the track 214 and the next outer track 226, and a D component 236 positioned circumferentially after the lower boundary 238 of the C component 232 and positioned radially to be symmetric about a line 235 midway between the track 214 and the next inner track 228.

As seen in FIG. 2A, in the illustrated configuration, each of the components 212, 216, 218, 232, 236 has an identical width 233, substantially equal to the nominal distance between two adjacent tracks. Typically, when the burst components 212, 216, 218, 232, 236 are written, they are first written in a size which is larger than the desired "nominal" size. This larger size is then trimmed typically simultaneously with the writing of another component of the servo burst. For example writing and trimming sequence can be as follows:
- write A, and trim B,
- move towards ID one half servo track
- trim C, write D,
- move towards ID one half servo track
- trim A, write B,
- move towards ID one half servo track
- write C, trim D, etc.

For example, if the A component 212 is originally written with a width greater than the depicted nominal width, the subsequent writing of the B components 216 or 218 is performed in such a manner as to simultaneously trim one side of the A component 212 (depending in which direction burst writing process is going, i.e. from ID to OD or vice versa).

The radial extent between a line one track outer 226 of the track 214 and one track inner 228 of the track 214 can be considered as defining four quadrants: Q0 240a, Q1 240b, Q2 240c, 240c' and Q3 240d. As shown, the quadrant Q2 is split into two half-quadrants at the inner and outer most regions.

With servo burst components configured as illustrated in FIG. 2A, the read head which travels along the track 214 will provide a characteristic pattern indicative of the tracking along the nominal track 214. The read head will first pass over component A and, because the head is substantially centered on component A, will provide a relatively large amplitude signal. Next, the head will pass substantially between the two B components 216, 218 and accordingly there will be substantially minimal signal at this time. Next, the head will pass over the inner half of component C 232 and then will pass over the outer half of component D 236. This will produce substantially mid-level amplitudes. This pattern can then be taken as indicative that the head is positioned on the nominal track 214. If the head is positioned other than centered along the track 214, the pattern of the servo burst signal A, B, C, D will be different, with such different patterns being indicative of the location of the actual head track.

Figure 2B:
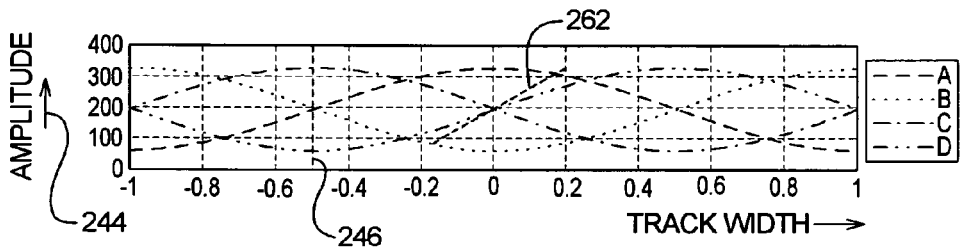
FIG. 2B is a graph depicting the head response for each of the four burst components of FIG. 2A as a function of radial position.

FIG. 2B is a graph depicting the nominal or expected read head response, in arbitrary amplitude units 244 as a function of the radial position of the head away from a center on zero location in units of track width, with positive values indicating deviation toward the inner diameter and negative values indicating deviation towards the outer diameter. For example, a pattern which corresponded to mid-level amplitudes for components A and B, minimal amplitude for component D and a maximum amplitude for component C would correspond to a path deviation 246 indicative of the head traveling along path 242 of FIG. 2A.

For each quadrant, different combinations of bursts are used to calculate the measured position. For example, in quadrant 0 240a:

$$\text{measuredPosition} \approx k(D-C) + \text{trackNumber}, \tag{1}$$

while around position 0.5 (Quadrant 1), $$\text{measuredPosition} \approx k(B-A) + \text{trackNumber} + 0.5, \tag{2}$$

etc.

A more accurate way of calculating position within a single quadrant takes into account all four bursts with different weighting coefficients, e.g., in quadrant 0:

$$X = A - B$$

$$Y = D - C$$

$$\text{measuredPosition} = (0.25 * 1.5 * Y)/(X + 0.5 * abs(Y)) + \text{trackNumber} \tag{3}$$

Figure 2C:
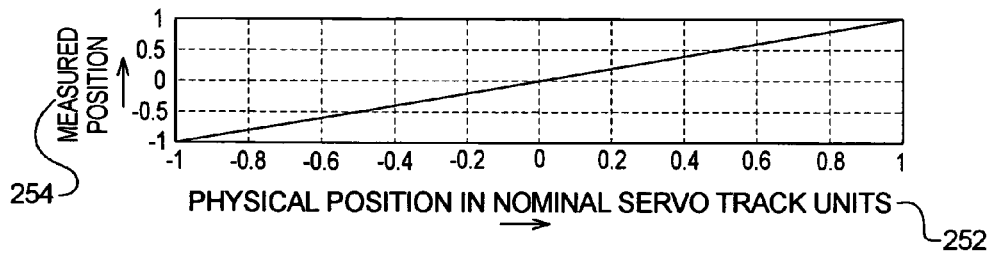
FIG. 2C is a graph of the measured position as a function of the physical position, in nominal servo track units for the bursts of FIG. 2A.

Although it is possible to devise various ways to derive position from the servo burst amplitudes, those with skill in the art will understand how to implement embodiments of the present invention for various track position detection (TPD) schemes, at least after understanding the present disclosure. The TPD algorithm described above results in a nearly linear relationship, as shown in FIG. 2C, between the physical position (shown in nominal track units) 252 and the measured position (also in nominal servo track units) 254. The existence of such a linear relationship depends at least in part on the accuracy with which the servo burst and servo burst components are positioned. Inaccuracies in the size, shape or location of the servo burst components can lead to various difficulties, including those described in more detail below. However, the example of an idealized or nominal positioning of servo burst components illustrated in FIGS. 2A, 2B, 2C can assist in understanding how a servo system can maintain desired tracking.

Figure 3:
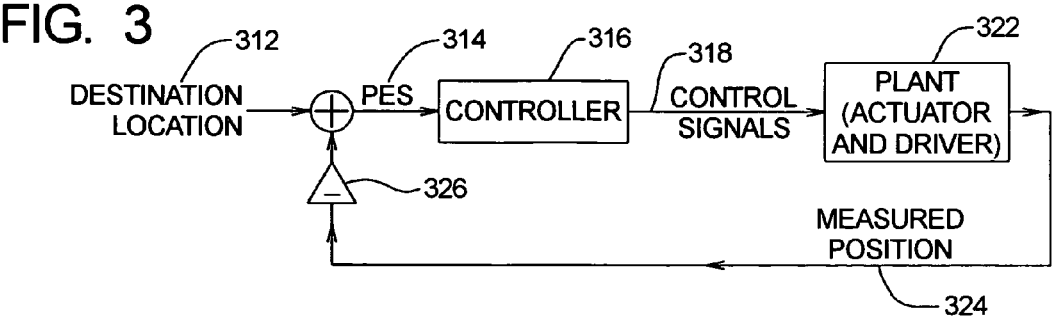
FIG. 3 is a block diagram of a control system of a type that can be used in connection with embodiments of the present invention.

In the control system illustrated in FIG. 3, a destination location signal (indicative of, e.g., a desired position relative to a track) 312 is input. A position error signal 314 is calculated, e.g., as described below and acts as input to a controller 316. The controller 316 outputs one or more control signals 318. The relationship of the input signal 314 to the output signal 318 represents the transfer function of the controller 316. The control signal 318 provides an input to the plant 322. For example, in the case of the hard disk drive, the plant 322 would include the disk drive actuator and driver. As a result of the operation of the plant 322, a signal indicative of "measured position" 324 is obtained. The relationship of the control signal 318 to the measured position 324 represents the transfer function of the plant 322. The position error signal 314 is obtained by subtracting 326 the measured position 324 from the destination location 312.

In order for a control system such as that depicted in FIG. 3 to remain stable, the gain margin of the system must be maintained at a desired level. A typical desired gain margin in this system would be around 4 dB. This corresponds to a factor of about 1.6. Assuming the system maintains its stability, the combination of the measured position 324 with the destination location 312 will provide a position error signal 314 with a sign and magnitude which will tend to drive the head toward the desired location 312, and thus substantially maintain tracking. In real world implementations, during operation of a disk drive, the position error signal 314 will be non-zero, i.e., there will be some difference between the actual position of the head and the desired or destination location, wherein the difference will fluctuate around zero due to control action.

Figure 4A:
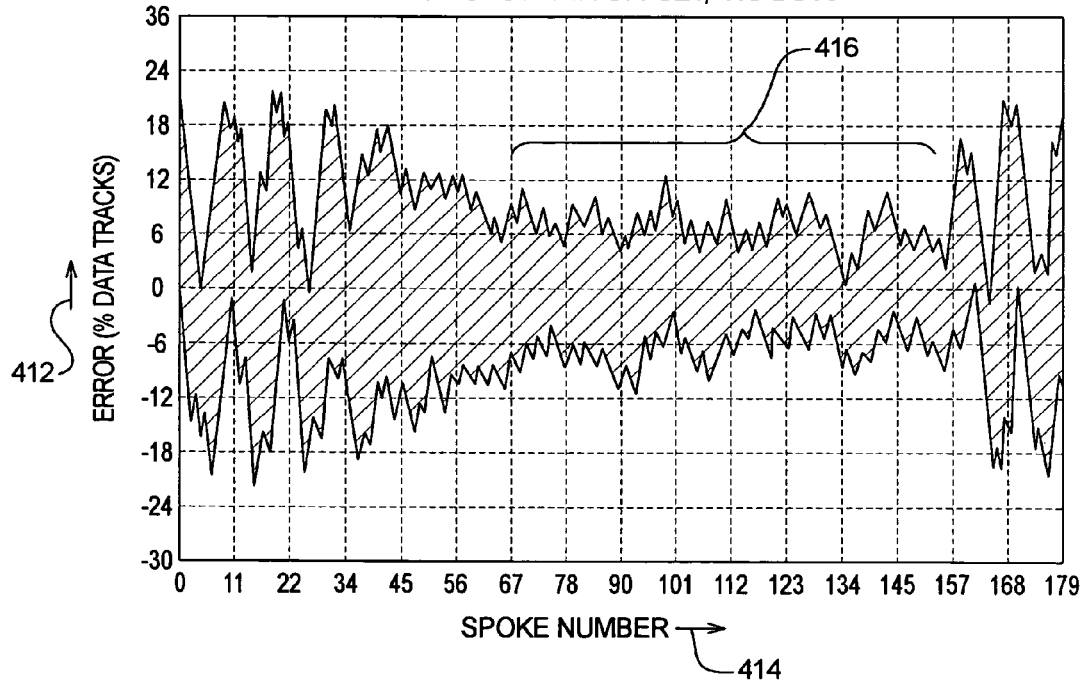
FIG. 4A is a graph of one example of the magnitude of the position error, expressed as a percentage of the track width, at each of the various spokes during a plurality of disk rotations, in typical previous systems, having no burst correction applied.

FIG. 4A illustrates one example of the magnitude of the position error (expressed as a percentage of the track width 412) at each of the various spokes 414 during a plurality of disk rotations. The data set forth in FIG. 4A corresponds to a disk drive system where the data tracks are 50% wider than the servo tracks. As will be understood by those skilled in the art, other relationships may exist between the size of the data tracks and the servo tracks. For example, if the error shown in FIG. 4A is expressed in servo track units instead of data track units, its amplitude would be 50% larger.

Figure 4B:
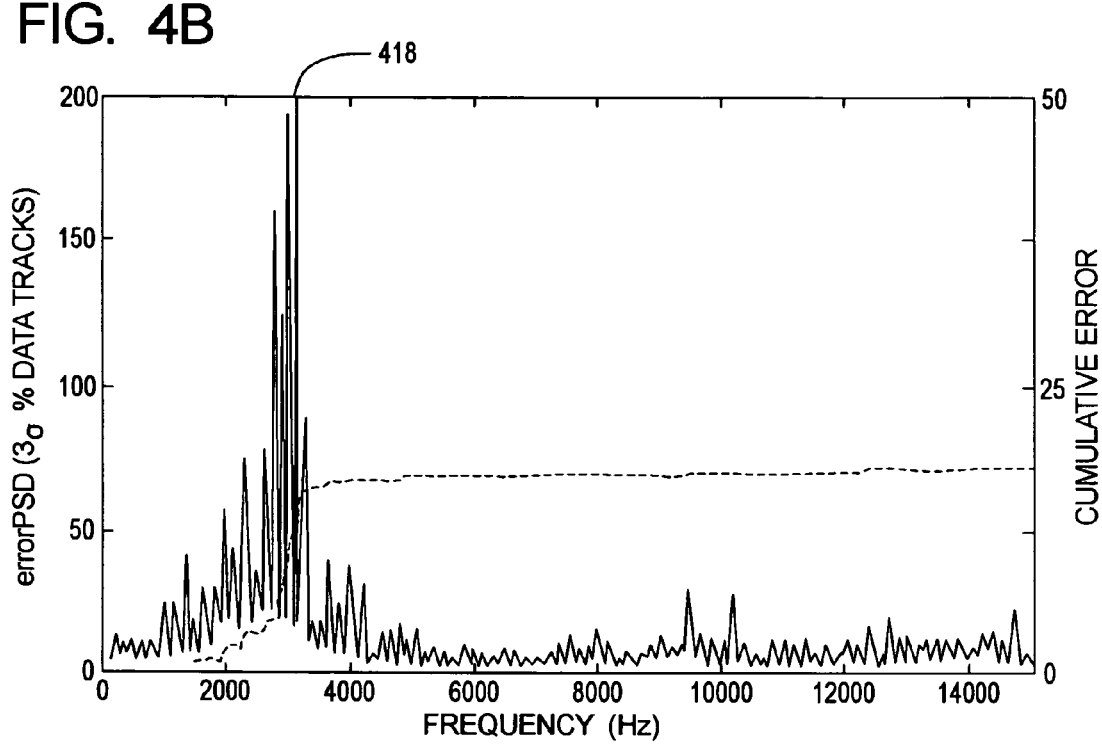
FIG. 4B corresponds to FIG. 4A but shows the error power spectral density PSD as a function of frequency, with increasing harmonics to the right.
Figure 4C:
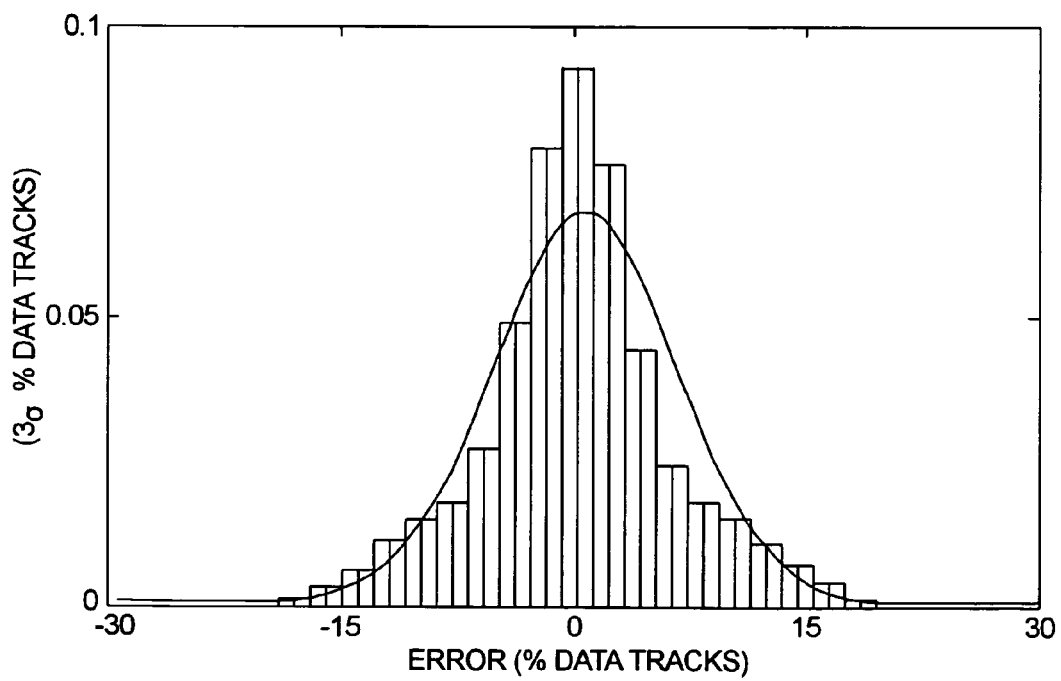
FIG. 4C is a histogram corresponding to FIG. 4A, illustrating relative frequency of various magnitudes of error.

FIG. 4B corresponds to FIG. 4A but shows the error power spectral density PSD (3σ) as a function of frequency, while FIG. 4C shows a histogram illustrating relative frequency of various magnitudes of error. In the example of FIG. 4A, the envelope shows relatively less error at some of the spokes 416. FIG. 4B shows a peak near 3,000 Hz 418. FIG. 4C shows substantial error at +/−15% of the data track.

Figure 4D:
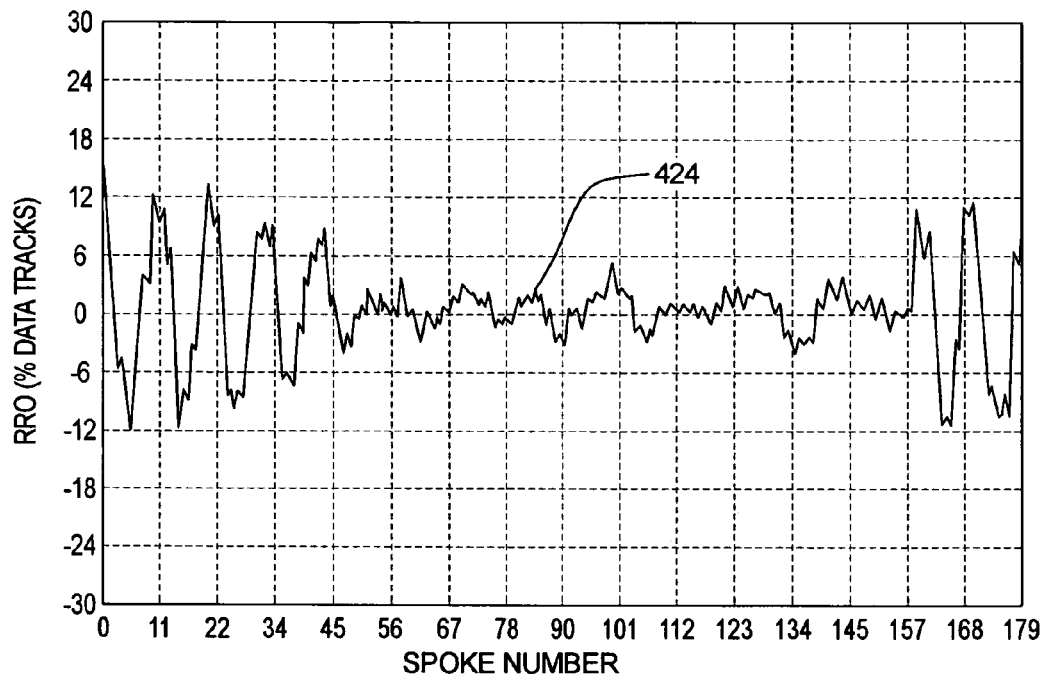
FIG. 4D is a graph corresponding to FIG. 4A, but showing the repeatable runout (RRO) component of error.
Figure 4E:
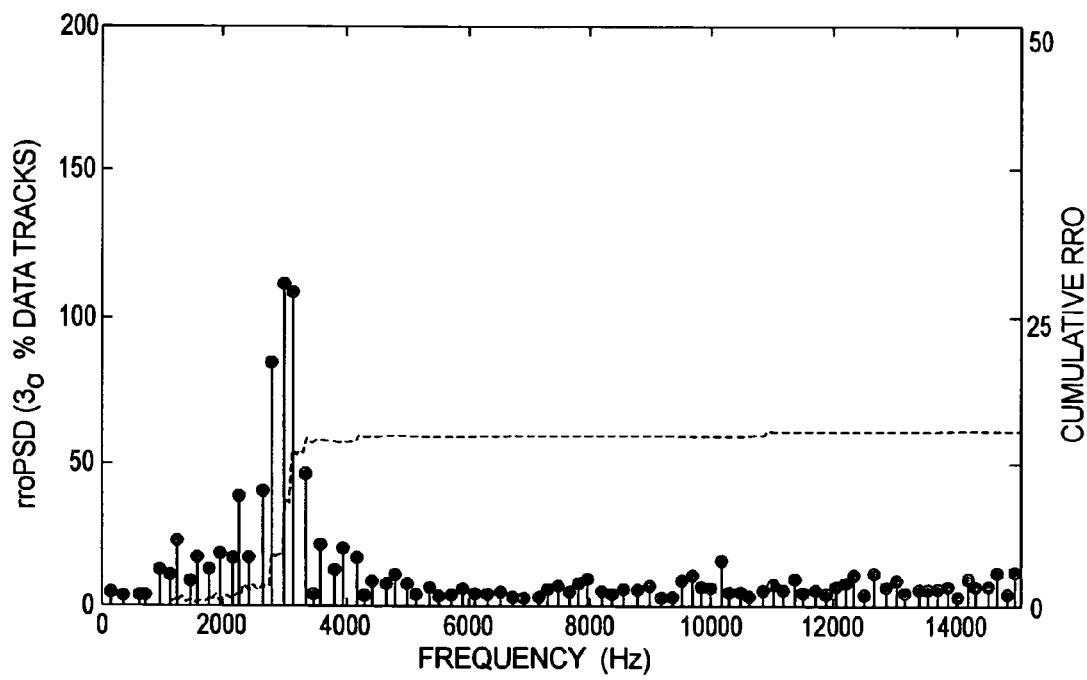
FIG. 4E is a graph corresponding to FIG. 4D, but showing the power spectral density PSD as a function of frequency spectrum.

By averaging error at the various spokes across multiple rotations, it is possible to obtain an indication of the amount of error that substantially repeats at each rotation, indicating the repeatable runout (RRO) 424 as shown in FIG. 4D, and the corresponding frequency spectrum FIG. 4E. Because the magnitude and sense of the runout is repeatable, and thus substantially predictable, it is possible to use this information to substantially eliminate the repeatable component from the position error signal, effectively straightening the track shape. Essentially, deviations from desired track shape are measured and averaged, (or other appropriate corrections are calculated) and burst connection values (BCVs) written to the media for every data track and these corrections are applied during tracking so the track shape becomes closer to circular. In at least one calculation, the first few harmonics of the track shape (toward the left of the graph in FIG. 4B) are excluded because these tend to change due to factors such as disk temperature, deformations or disk slip and accordingly cannot readily be accounted for when burst correction values are permanently written to the media during the drive self-test and calibration process. In one approach, the first few harmonics are followed by the servo loop and by using an additional feed-forward control input. The additional control input is continuously calculated from the PES signal with the goal of driving the PES to zero at these particular frequencies. This process is designated "automatic runout calibration" (ARC). This type of approach is described in U.S. Provisional Patent Application Ser. No. 60/339,463 filed Dec. 11, 2001 and U.S. patent application Ser. No. 10/318,316 filed Dec. 11, 2002, both of which are incorporated herein by reference. Other approaches are described in U.S. Pat. No. 6,549,362 to Melrose et al. issued on Apr. 15, 2003, U.S. Pat. No. 6,115, 203 to Ho et al. issued Sep. 5, 2000, and U.S. Pat. No. 5,793,559 to Shepherd et al. issued Aug. 11, 1998, all of which are incorporated herein by reference.

Figure 5A:
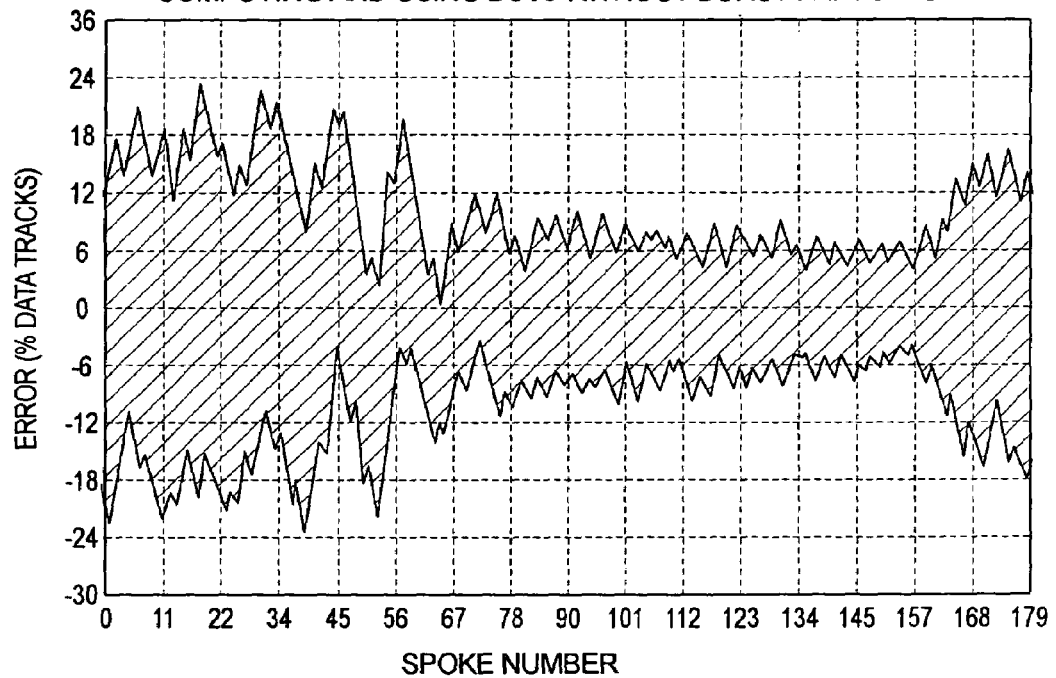
FIGS. 5A-5E correspond to FIGS. 4A-4E, respectively, but for an example after a Burst Correction Value procedure is applied, according to previous approaches.
Figure 5B:
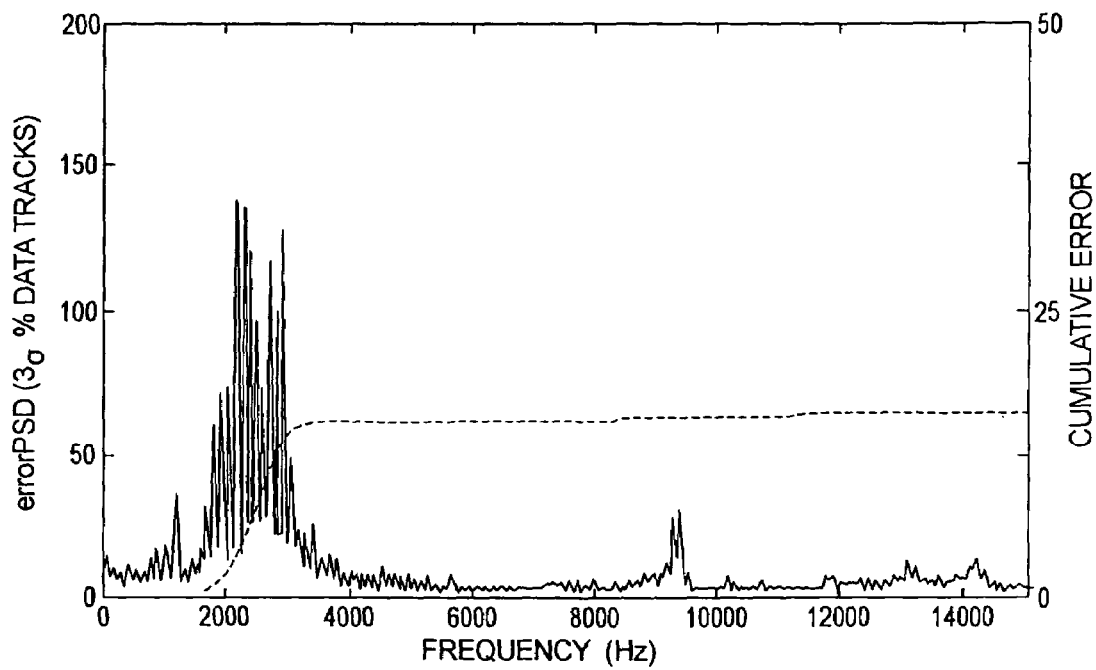
Figure 5C:
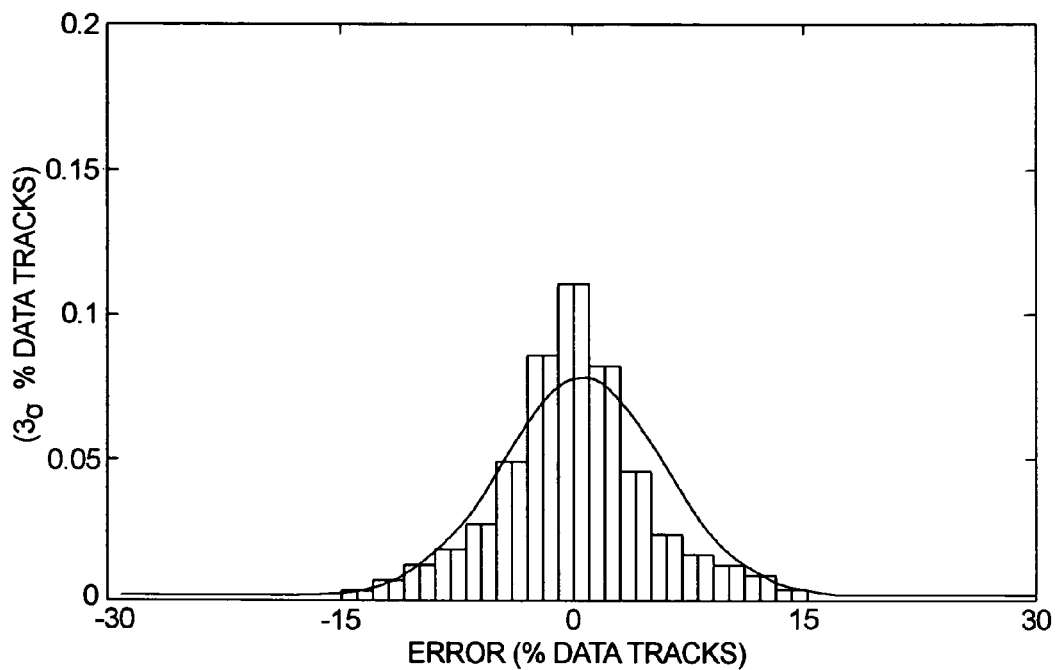
Figure 5D:
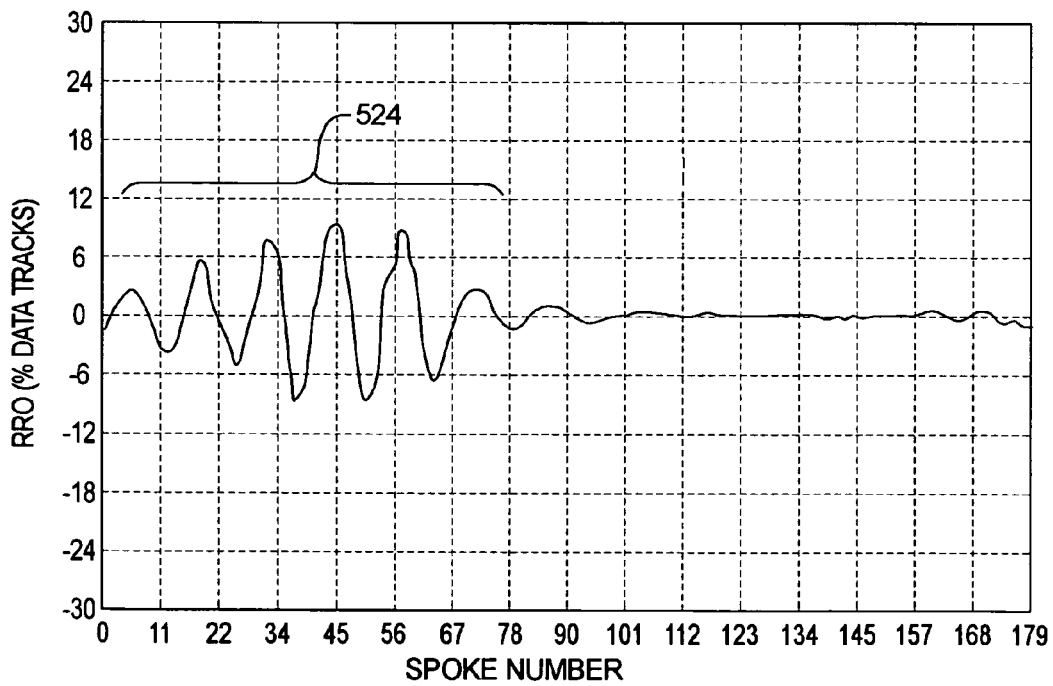
Figure 5E:
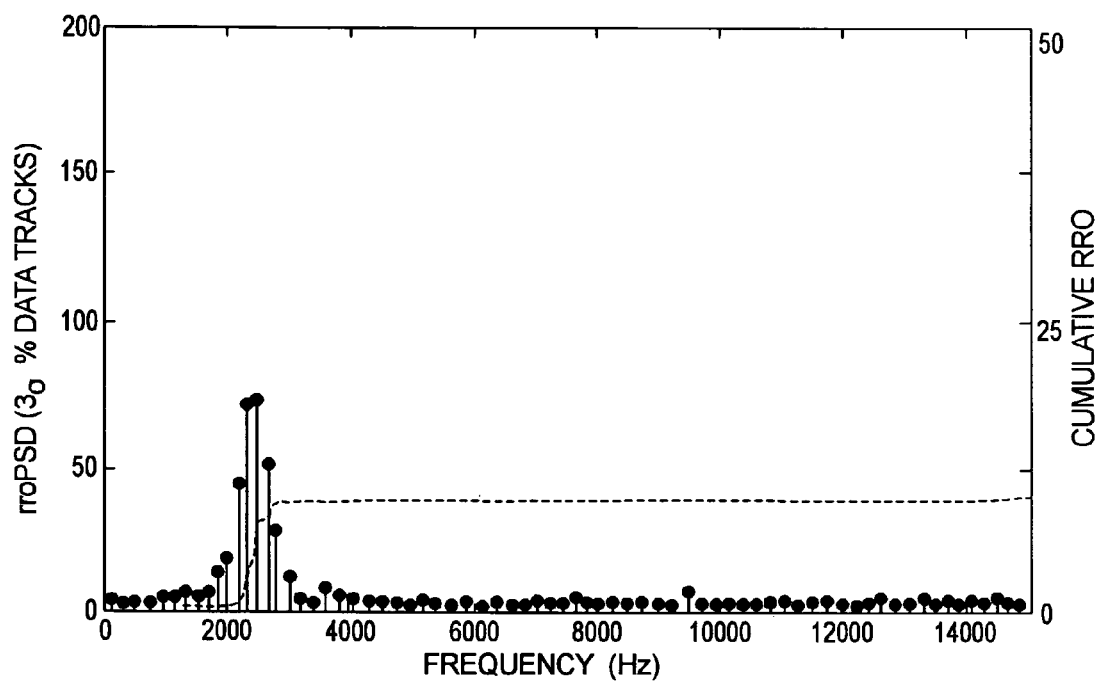
Figure 6:
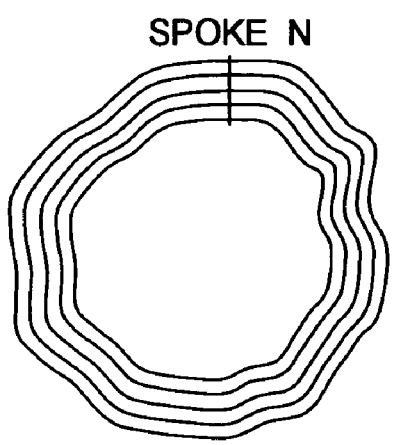
FIG. 6 is a simplified exaggerated top plan view of a plurality of non-circular, but coherent tracks.
Figure 7:
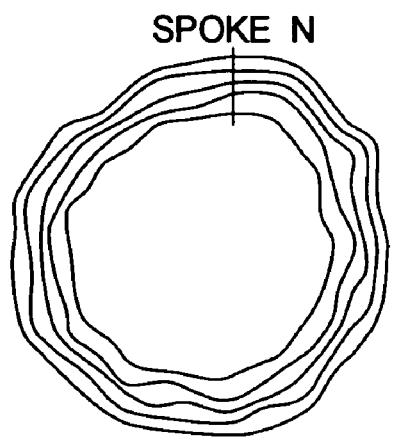
FIG. 7 is a simplified exaggerated top plan view of a plurality of non-circular, non-coherent tracks.

FIGS. 5A-5E illustrate the effect of using a BCV calculation. As is clear from FIG. 5D, the BCV method is not effective everywhere across the track 524. It is believed that the BCV method effectiveness is substantially limited to situations in which servo bursts are written to the media in an identical pattern from track to track, i.e., such that the servo writer follows almost identical closed trajectories at every track in the servo writing process during which the servo bursts are written. This would mean that while the track shapes may not necessarily be circular, they will have substantially the same phase and amplitude components, i.e., track shapes and burst arrangements are substantially coherent, e.g., as illustrated in exaggerated fashion, in FIG. 6. Although complete coherence is not obtained in reality, if deviations from coherence are small (i.e., burst widths do not vary by more than several percent) from track to track, the BCV method may provide usable results. If, however, burst component deviations are more than several percent, the distance between adjacent tracks is not constant along the tracks resulting in a non-coherent set of tracks, e.g., as illustrated (in exaggerated fashion) in FIG. 7. This means that the relationship between the physical radial increment on the disk (i.e., actual position) and the measured radial increment using track position detection from the burst amplitudes (measured position) is not linear across the disk. It is believed that existence of such non-coherency is at least partially responsible for the inability of a BCV method to be effective in all circumstances, e.g., as illustrated in FIG. 5D 524.

Figure 8A:
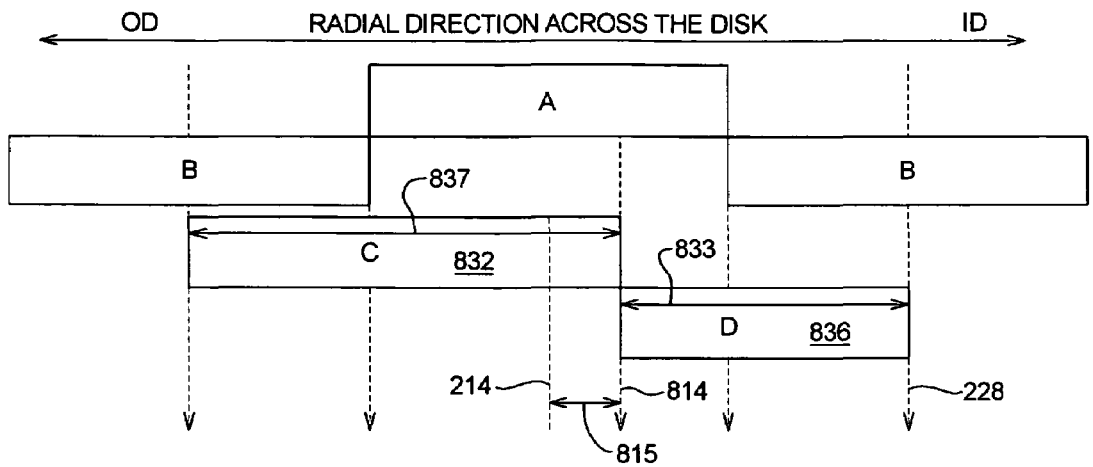
FIGS. 8A-8C correspond to FIGS. 2A-2C, respectively, but for servo bursts which are distorted with respect to nominal positions.

FIG. 8A illustrates one type of single burst component pair distortion which, it is believed, can create undesired effects. By comparing FIG. 8A with FIG. 2A, it is seen that burst component C 832 has a width 837 that is wider than the desired or nominal width (illustrated in FIG. 2A 232), at the expense of component D 836 which, accordingly, has a width 833 which is smaller than the nominal width 233. Typically, such distortions of burst components result from disturbances in the servo writing positioning loop and/or spindle disturbances during the servo writing process. For example, the distortion depicted in FIG. 8A can occur when burst C 832 encroaches into burst D 836 during the trimming of the burst D 836 and the writing of burst C 832 (which happens simultaneously) in a servo writing process that proceeds from the inner diameter to the outer diameter.

Figure 8B:
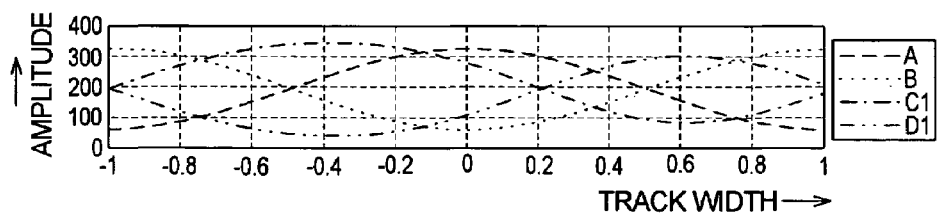
Figure 8C:
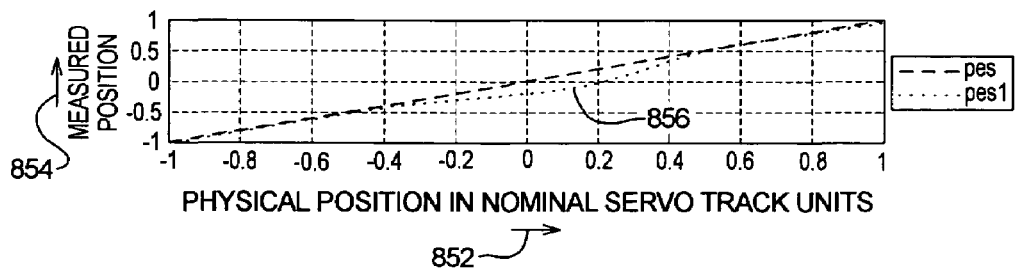

Because of the distorted shape of burst components 832, 836, the relationship of detected amplitudes, as a function of distance from the track center, is also changed, as can be seen by comparing FIG. 8B with FIG. 2B, i.e., the line dividing the radial extent of burst C 832 from the radial extent from burst D 836 (the "C/D null point") 814 is shifted a distance 815 from the nominal C/D null point 214. In view of such C/D null point shift 815, the TPD algorithm, in the absence of further correction, results in a non-linear relationship 856 (FIG. 8C) between the measured position 854 and the physical position 852. The gain margin of the servo loop depends on a number of parameters, including the slope of the curve 856 and, if the non-linearity 856 is large enough, the increased slope in at least some regions of the curve 856 can create instability at one or more of the spokes. If, particularly, several spokes are affected with similar kinds of distortion (i.e. track squeeze), the servo instability can grow progressively larger until either the head reaches one or more good spokes (with relatively undistorted servo bursts) and the servo loop stabilizes itself, or the entire track is subject to servo instability.

According to an embodiment of the invention, a correction β is applied to the C and D burst amplitudes before they enter the TPD equation. The correction data is a function, preferably of the C/D shift 815 (designated "$d_{cd}$") which is, preferably, substantially a measured quantity. In one embodiment, β is proportional to the C/D shift, $\beta=-gd_{cd}$, where g is the slope 262 of the nominal burst response around a null point. In one embodiment, the deviation or shift d is partially based on the error (i.e., partially based on the position error signal) but preferably also takes into account the properties of the control system (FIG. 3) such as by including information indicative of the transfer function of the controller 316 and plant 322. In general, the transfer functions of the controller 316 and plant 322 can be obtained from Bode plot data which is measured during disk drive setup or characterization, such as during drive self-test or similar procedures. Typically, the Bode plot data is or may be stored on the disk. As noted above, the repeatable runout RRO, (or at least, higher-frequency RRO) can be obtained by averaging the position error signal (PES), e.g., over about a dozen revolutions or more.

In one embodiment, the deviation $d_{CD}$ is obtained according to:

$$d_{CD} = RRO \otimes IDFT(1+C*P)$$

where $\otimes$ represents circular convolution in time domain;
RRO represents repeatable runout;
C represents the controller transfer function;
P represents the plant transfer function; and,
IDFT is Inverse Discrete Fourier Transform.

When β is calculated in this fashion, the magnitudes of the C and D measurements are corrected to:

$$C_{corrected} = C + \beta \quad (5)$$

$$D_{corrected} = D - \beta \quad (6)$$

Figure 9A:
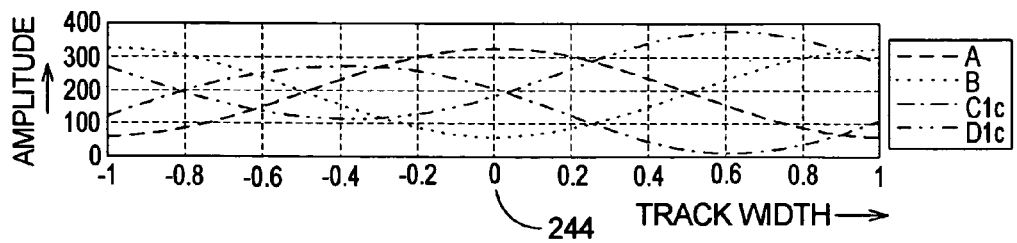
FIGS. 9A and B correspond to FIGS. 8B and 8C, respectively, but showing the effect of applying burst correction according to an embodiment of the present invention.
Figure 9B:
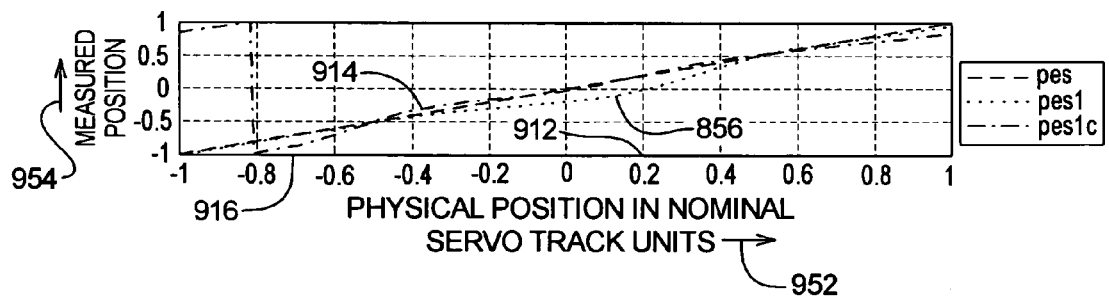

When the correction of equations (5) & (6) are applied, the resultant corrected servo component amplitudes are illustrated in FIG. 9A and the relationship with the physical position result in the measured position result in the curve 914 (FIG. 9B) with the uncorrected curve 856 also shown for comparison. Compared to the uncorrected relationship, at least in a mid-range (e.g., between −0.5 and +0.6 servo tracks around the nominal destination), the relationship between the measured 954 and physical 952 position becomes more linear (compared to the uncorrected relationship 856) and very close to the nominal (linear) relationship. Although the corrected relationship becomes more non-linear beyond this range, few if any problems are created since, in that range the burst shift has no adverse affects on the uncorrected measured position 856 and the burst correction would not be invoked if the target servo location is there. For example, if the target destination is at 0.2 (912), the correction will be used (i.e., measured position will be calculated according to curve 914). On the other hand, if the target destination is, e.g., at −0.7 (916), the correction will not be used (i.e., measured position will be calculated according to curve 856). The decision whether to calculate correction or not will be made during the track verification process which is part of the drive's self-test. Only the tracks that fall in the non-linear region of the measured position curve will be candidates for burst correction.

Figure 10A:
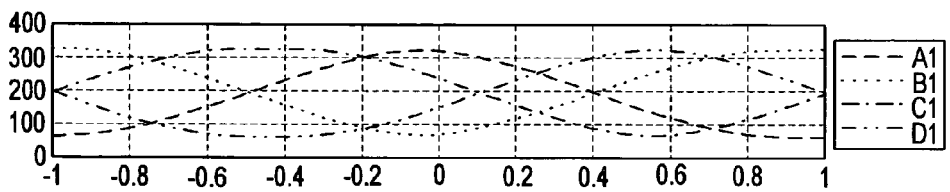
FIGS. 10A and 10B correspond to FIGS. 9A and 9B, respectively, but for a case in which two adjacent burst pairs are written with an offset, without correction.
Figure 10B:
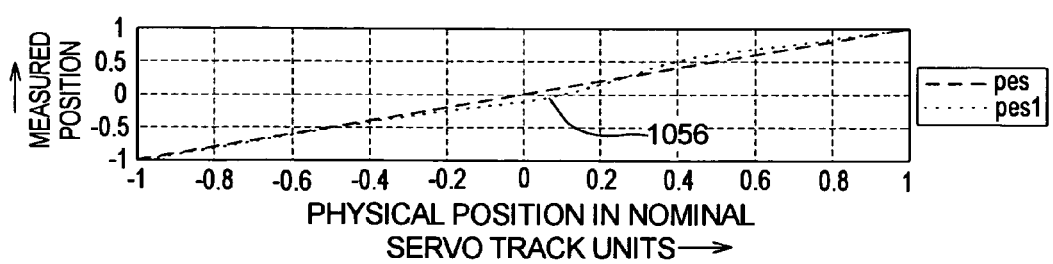

The example above illustrates a manner in which correction can be applied when there is a shift of the C/D null point. FIG. 10A illustrates an exemplary response for each of the four burst components as a function of radial position, if both the C/D null point and the A/B null point are shifted. FIG. 10B illustrates the resultant relationship of measured versus physical position 1056. When both the A/B null points and C/D null points are shifted, it is possible to provide corrected burst amplitudes according to:

$$A_{corrected} = A + \alpha$$

$$B_{corrected} = B - \alpha$$

$$C_{corrected} = C + \beta$$

$$D_{corrected} = D - \beta \quad (7)$$

where $$\alpha = -g d_{AB}$$

$$\beta = -g d_{CD} \quad (8)$$

Figure 11A:
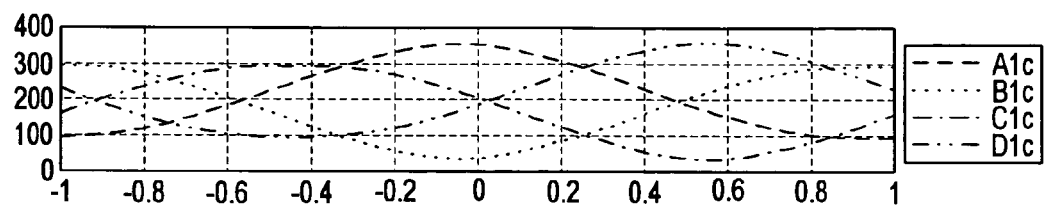
FIGS. 11A and 11B correspond to FIGS. 10A and 10B, but with correction applied according to an embodiment of the present invention.
Figure 11B:
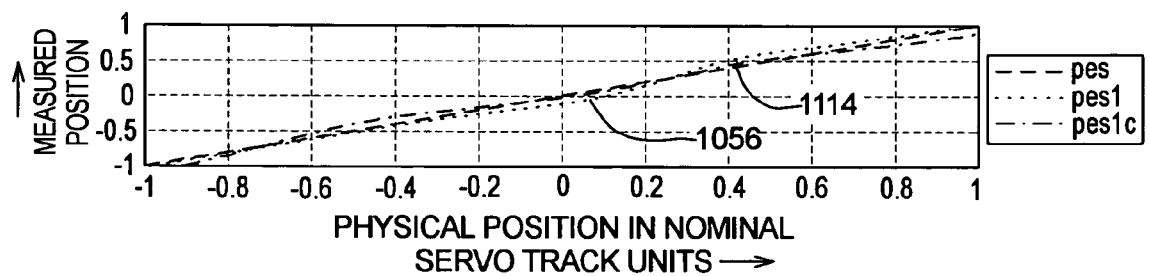

When the corrections of equation (7) are applied, the resultant read head response for each of the four corrected burst components (as a function of radial position) is illustrated in FIG. 11A and the relationship of the measured versus the physical position 1114 (FIG. 11B) is substantially more linear than at least portions of the corresponding uncorrected relationship 1056.

The described method can be applied for any track, i.e., destination location, which exhibits increased track misregistration (TMR), e.g., due to defective bursts, by applying the α and β corrections of equation (8) ("burst pair corrections", BPC) at every spoke of the affected track. In one embodiment, the BPC's are calculated and written to the media as part of the servo spoke data (payload) during the drive's calibration and self-test process.

Figure 12:
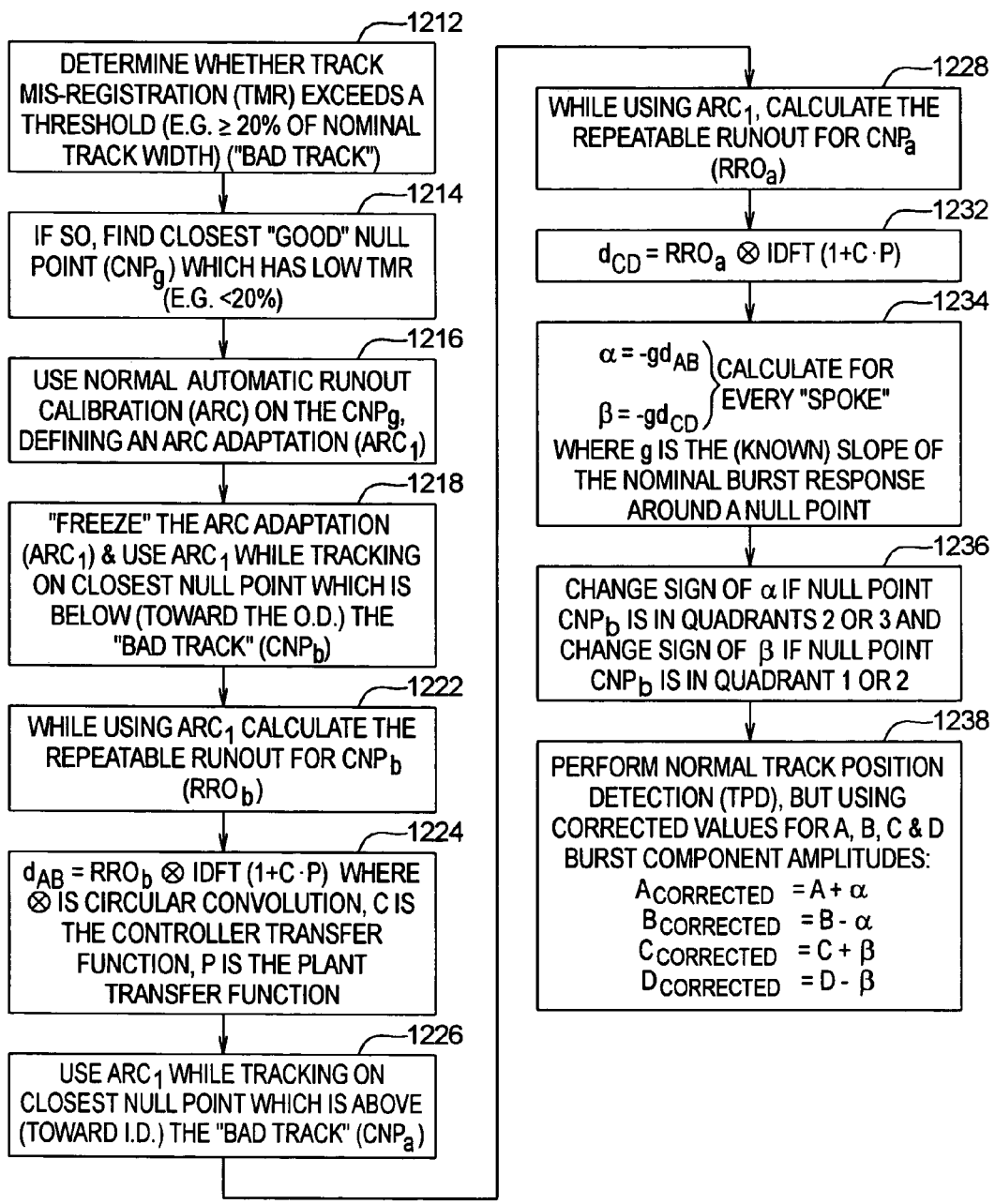
FIG. 12 is a flowchart of a procedure that can be used according to an embodiment of the present invention.

FIG. 12 illustrates a process which can be used to implement a burst pair correction (BPC) according to an embodiment of the present invention. In the procedure depicted in FIG. 12, if it is determined that, e.g., at a particular spoke, the amount of track misregistration (TMR) exceeds a threshold value (e.g., exceeds about 20 percent of the nominal track width) such that the track, at least at this spoke, is a "bad track" 1212, the system then locates the closest null point which is "good" (e.g., which has a low TMR, such as less than about 20 percent, at all spokes of the track), designated $CNP_g$ 1214. The normal automatic runout calibration (ARC) found in at least some disk drives, and generally described above, is used on $CNP_g$ and defines an arc adaptation ($ARC_1$) 1216. This arc adaptation $ARC_1$ is then frozen (so that it does not undergo further change) and the frozen $ARC_1$ is used while tracking on the closest null point (to $CNP_g$) which is below (i.e., toward the inner diameter) the "bad track" $CNP_b$ 1218. While using the $ARC_1$ on the $CNP_b$ the repeatable runout for $CNP_b$ is calculated (designated $RRO_b$ 1222). $RRO_b$ is convolved, using circular convolution in the time domain, with IDFT of a function which is the sum of one and the product of the control transfer function C and the plant transfer function P to yield a value indicative of A/B null point shift, termed $d_{AB}$ 1224 (or it may be C/D depending on the quadrant to which $CNP_b$ belongs).

While still using $ARC_1$, the system then tracks on the closest null point which is above (i.e., toward the outer diameter), the "bad track ($CNP_a$ 1226). While using $ARC_1$, the repeatable runout for $CNP_a$ is calculated (termed $RRO_a$ 1228). $RRO_a$ is circularly convolved in the time domain with a function which is IDFT of the sum of 1 and the product of the control transfer function and the plant transfer function, to yield a value indicative of C/D null point shift, termed $d_{CD}$ 1232 (or it may be A/B depending on the quadrant to which $CNP_a$ belongs). The values $d_{AB}$ and $d_{CD}$ are then used to calculate correction values α and β for each spoke of the track, at least in affected portions of the track 1234 according to equation (8). The sign of α and β will be selected 1236 depending on the location of $CNP_b$ and $CNP_a$ relative to the quadrants 240A, B, C, D. The sign of α is changed if the null point $CNP_b$ is in quadrant 2 or 3 and the sign of β is changed if the null point $CNP_b$ is in quadrant 1 or 2. By definition, null points $CNP_b$ and $CNP_a$ are always in adjacent quadrants, e.g., 240A, 240B or 240C, 240C, etc. Track position detection (TPD) is then performed using corrected values for A, B, C and D, according equation (7) 1238.

Figure 13A:
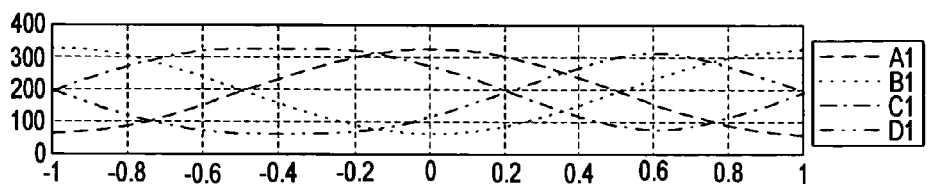
FIG. 13A is a graph showing the read head response for each of the four burst components with the C/D null point, which has been misplaced.
Figure 13B:
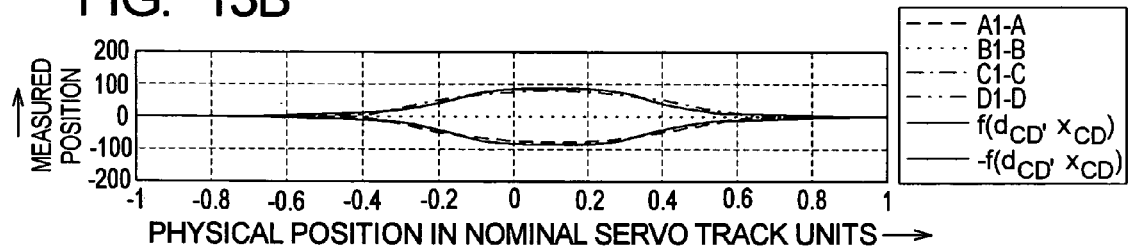
FIG. 13B is a graph showing the difference between nominal and misplaced burst amplitudes and the approximation of the difference.
Figure 14A:
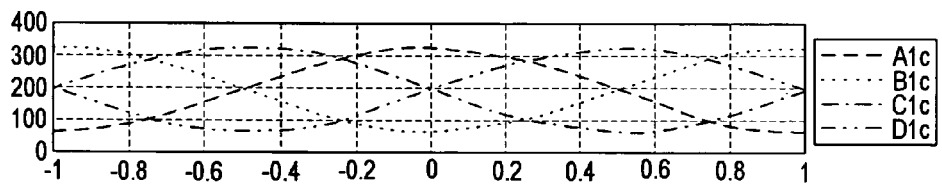
FIGS. 14A and 14B correspond to FIGS. 9A and 9B, respectively, but for a case in which two adjacent burst pairs are written with an offset, with correction applied according to an embodiment of the present invention.
Figure 14B:
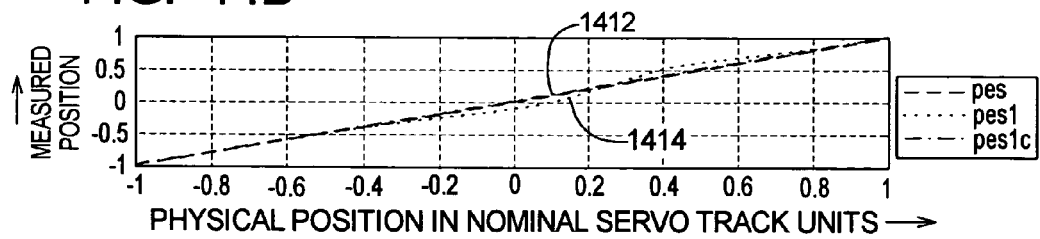
Figure 15A:
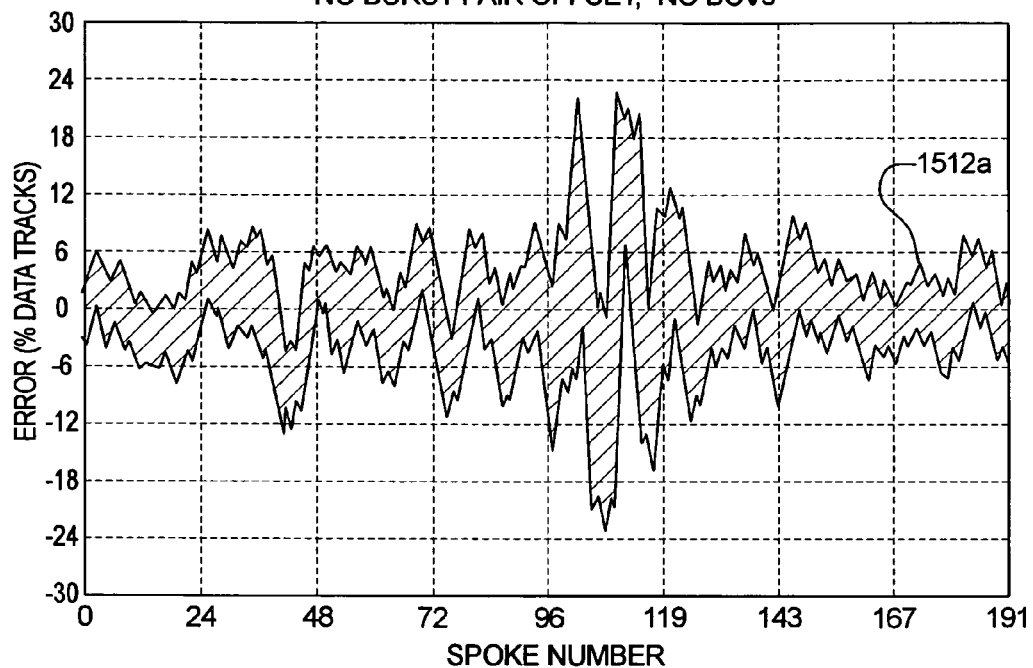
FIGS. 15A-15E correspond to FIGS. 4A-4D, without correction applied according to the present invention, for a track with squeezed bursts.
Figure 15B:
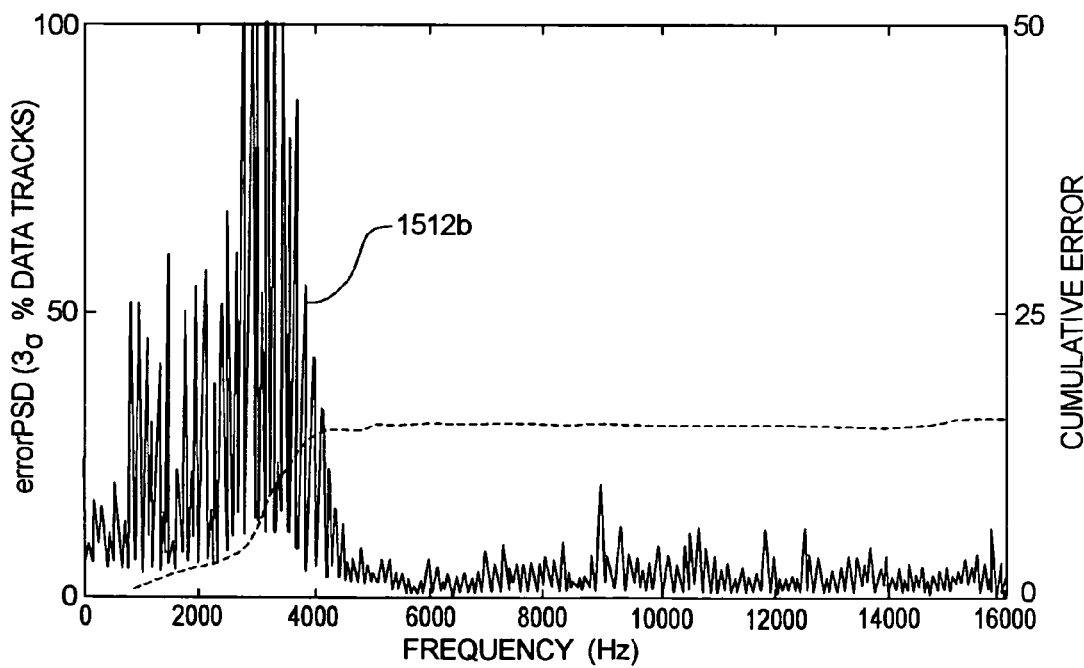
Figure 15C:
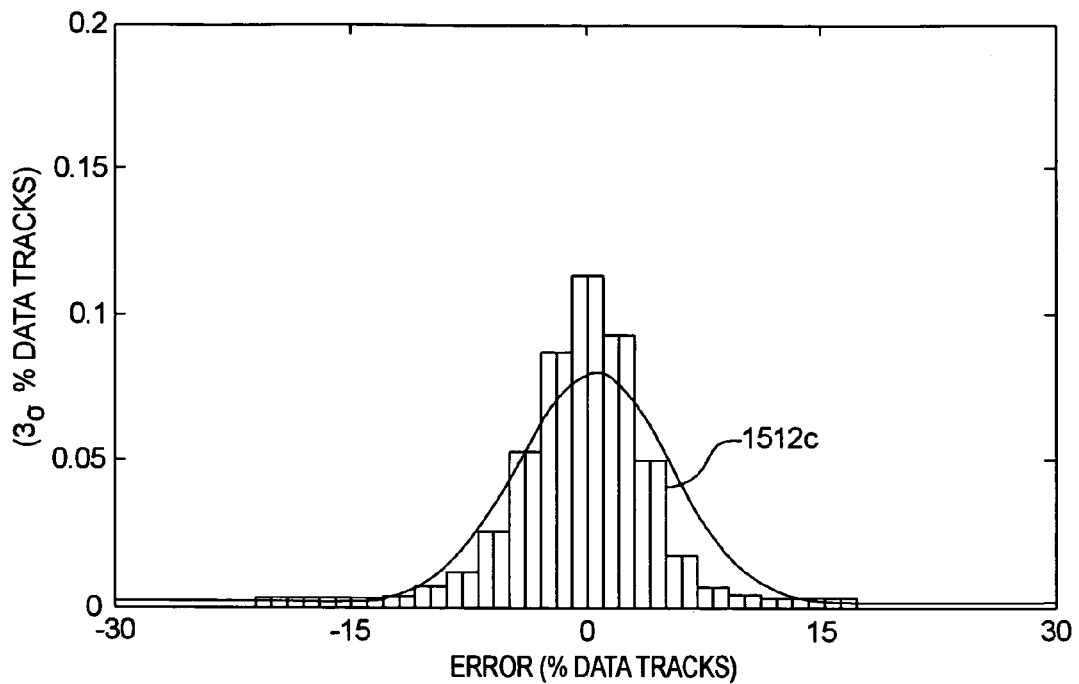
Figure 15D:
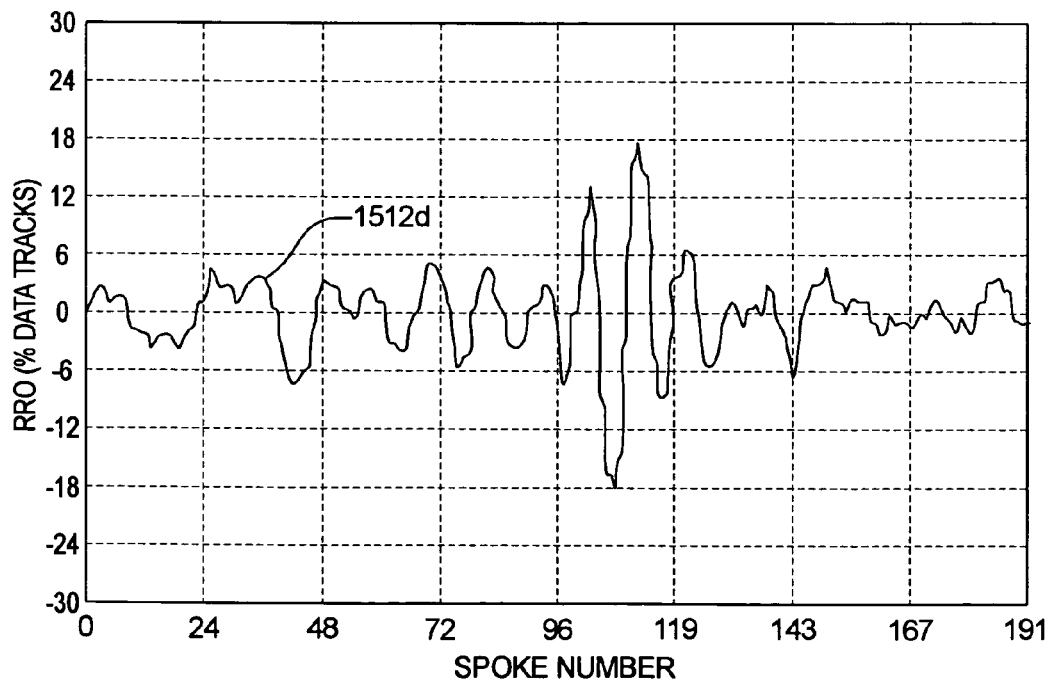
Figure 15E:
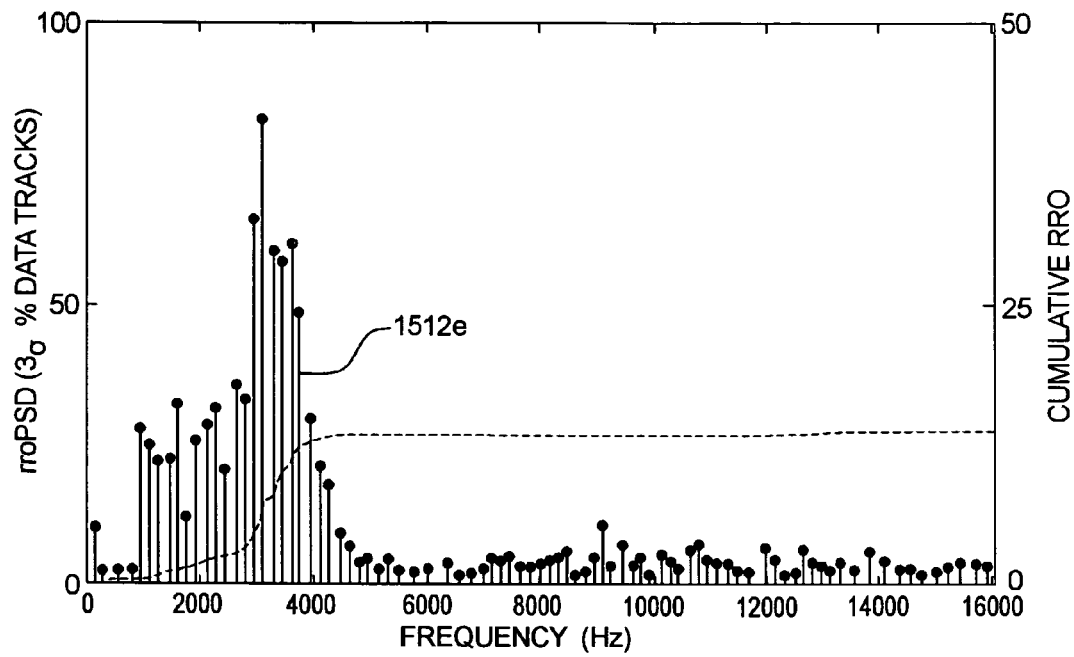
Figure 15F:
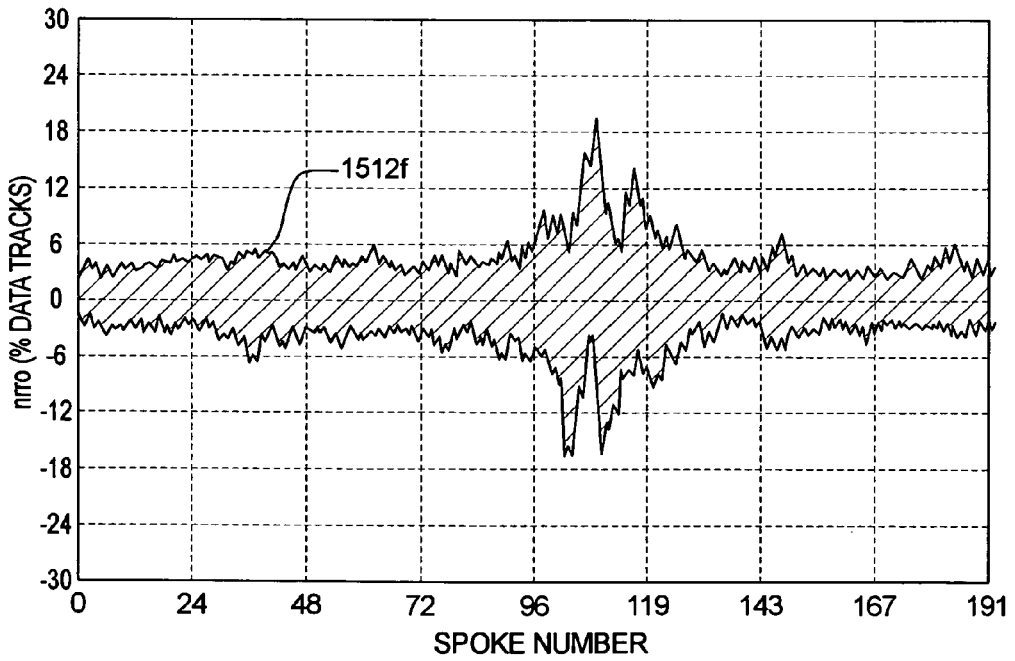
FIGS. 15F-H correspond to FIGS. 15A-C, but with the repeatable runout component removed.
Figure 15G:
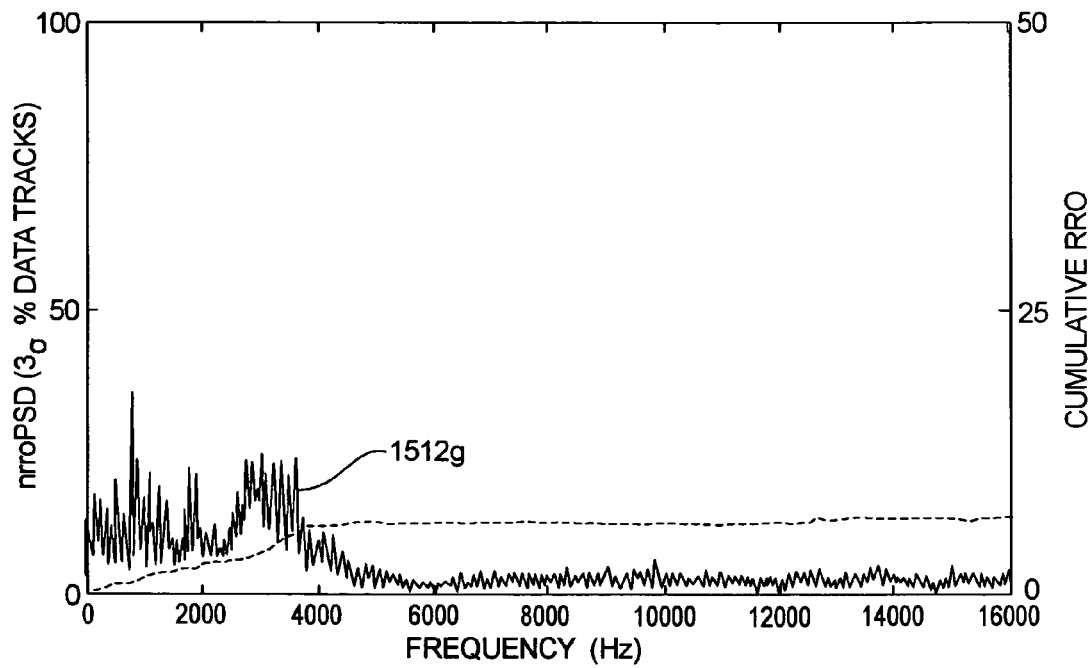
Figure 15H:
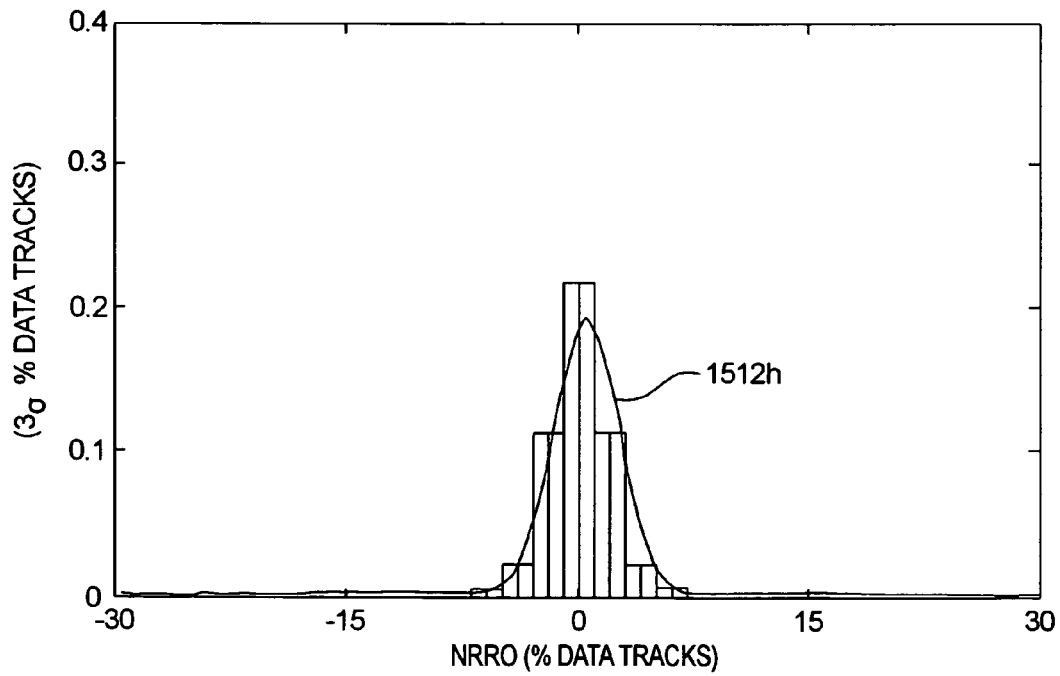

Equation (8) provides for determining correction values α and β as linear functions of $d_{AB}$ and $d_{CD}$, respectively. There are other manners of determining correction values α and β so as to maintain stability despite burst component distortions. For example, α and β can be calculated according to:

$$\alpha = f(d_{AB}, x_{AB})$$

$$\beta = f(d_{CD}, x_{CD}) \qquad (9)$$

where $x_{AB}$ is the distance between the destination location and the nominal A/B null point, and $x_{CD}$ is the distance between the destination location and the nominal C/D null point. Various functions f can be used for this purpose. For example, if f is defined as:

$$f(d_{AB}, x_{AB}) = gd_{AB}/(1 + (2(x_{AB} - d_{AB}/2)/(0.5 + d_{AB}/2))^4)$$

$$f(d_{CD}, x_{CD}) = gd_{CD}/(1 + (2(x_{CD} - d_{CD}/2)/(0.5 + d_{CD}/2))^4) \qquad (10)$$

the read head response for each of the four burst components (as a function of radial position with the C/D null point misplaced), as illustrated in FIG. 13A, results in a difference between nominal and misplaced burst amplitudes and the approximation of the difference is illustrated in FIG. 13B. When BPC's are calculated according to equation (10), for the burst distortion depicted in FIG. 10A, the resulting correction will provide a read head response for each of the four corrected burst components as illustrated in FIG. 14A and a relationship 1412 of measured position versus physical position which, as illustrated in FIG. 14B is more nearly linear than the uncorrected relationship 1414. In at least this example, the higher order of approximation of burst correction from equation (10) provides improved correction, compared to the linear approximation obtained from equation (8) and extends the position range for which the correction is substantially accurate.

Figure 16:
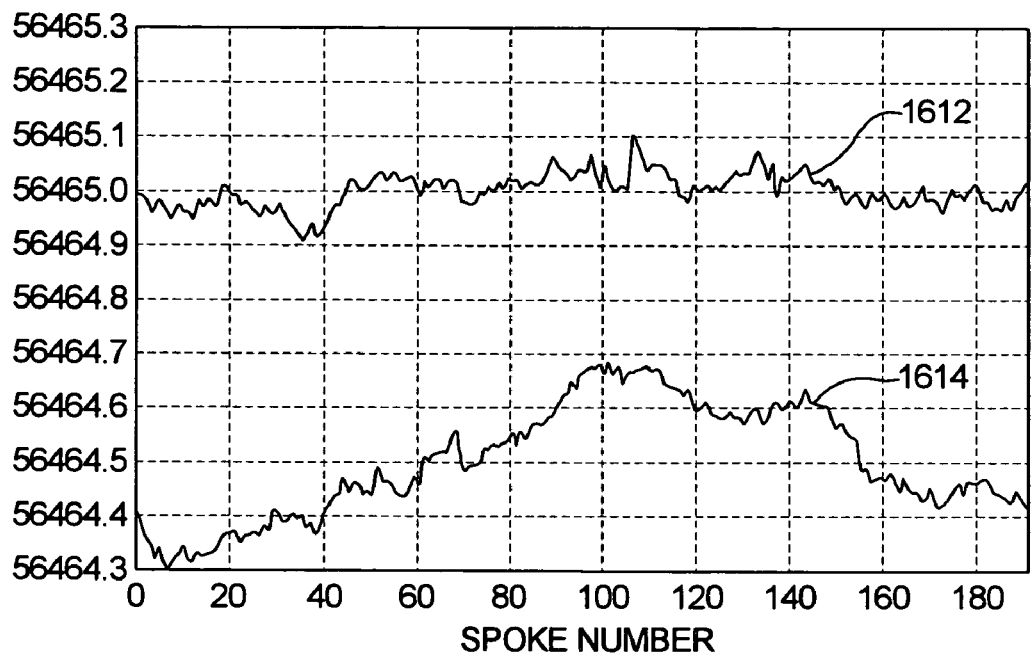
FIG. 16 is a graph showing null point locations, expressed in servo track units, at various spoke numbers along a track.
Figure 17A:
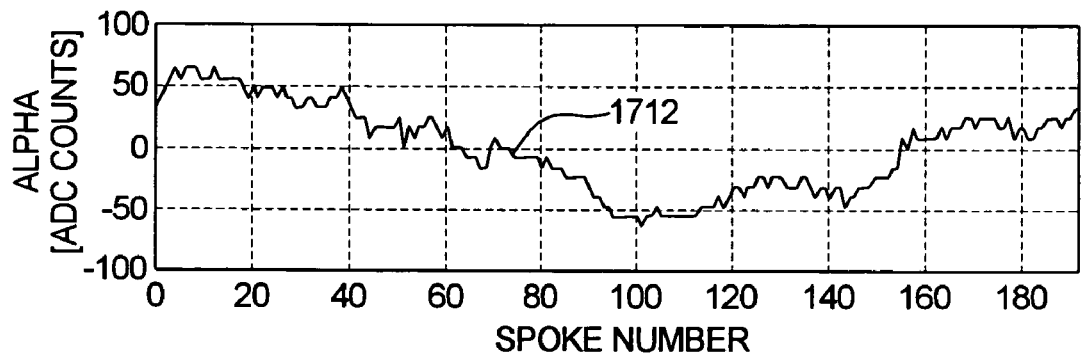
FIGS. 17A and 17B are graphs showing values of the correction factors $\alpha$ and $\beta$, respectively, calculated according to an embodiment of the present invention, at various spokes along the track.
Figure 17B:
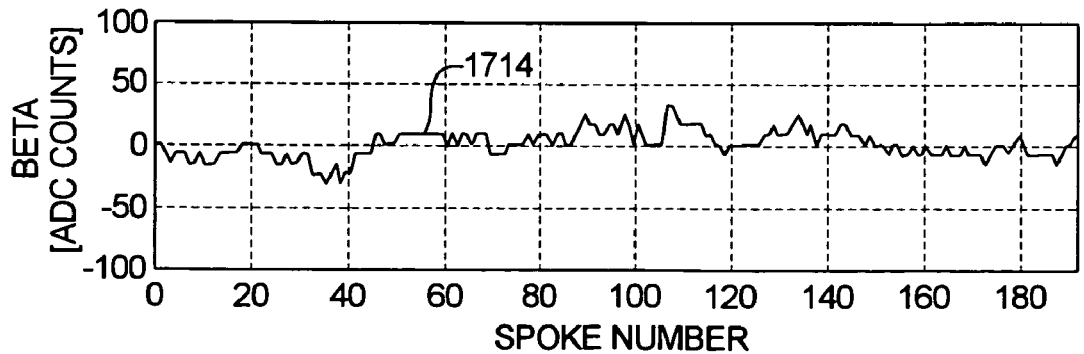
Figure 18A:
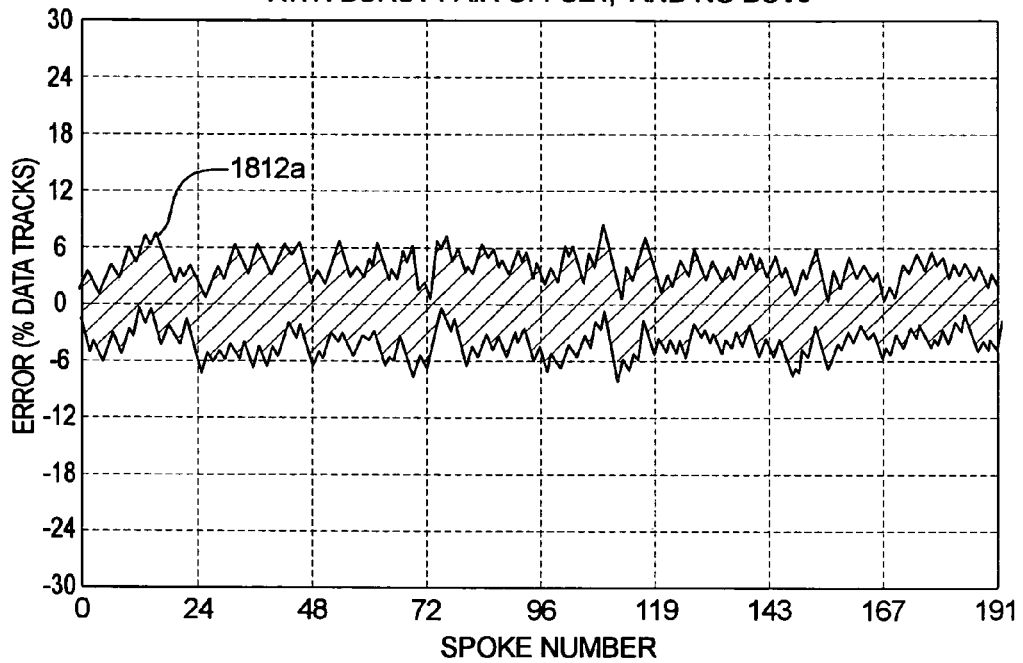
FIGS. 18A-18H correspond to FIGS. 15A-15H but with correction procedures, using the values of FIGS. 17A and 17B, according to an embodiment of the present invention.
Figure 18B:
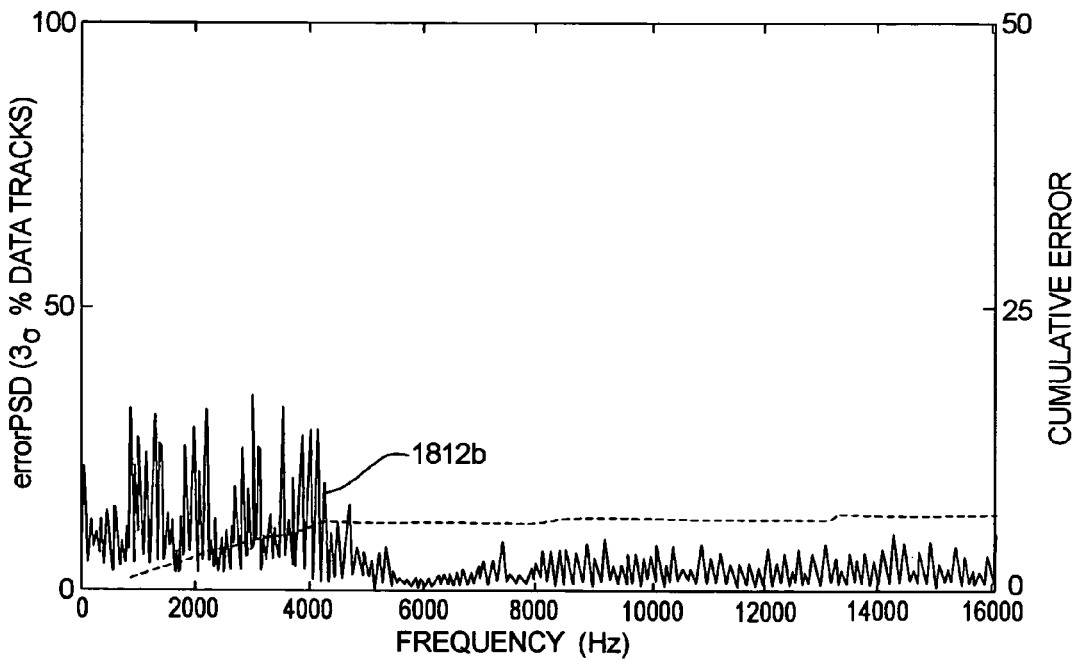
Figure 18C:
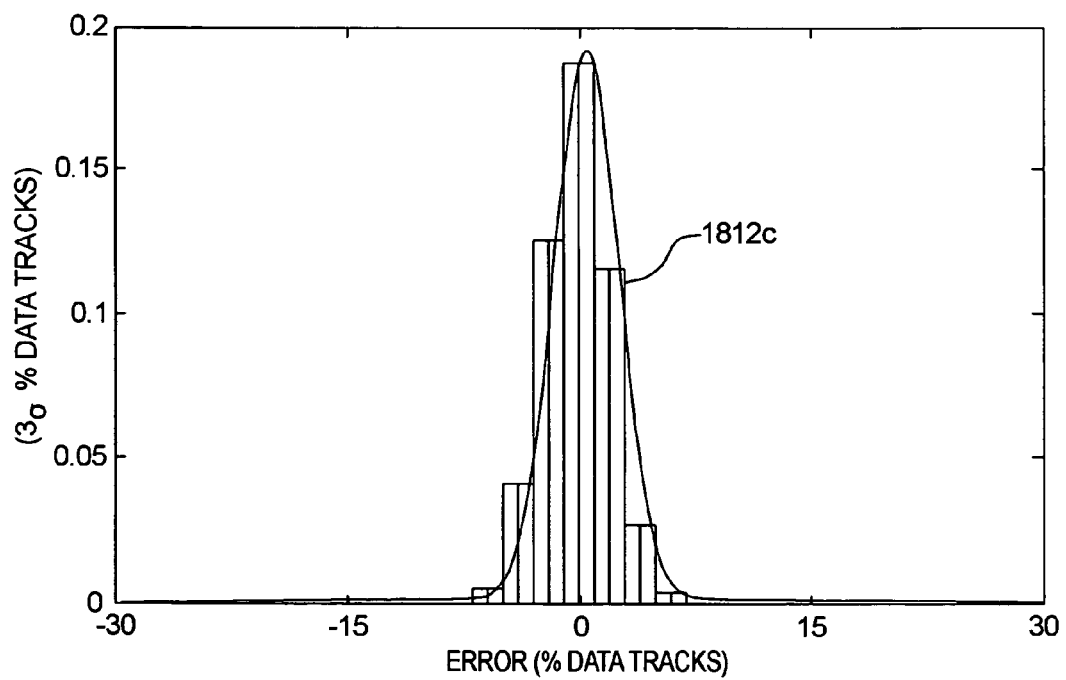
Figure 18D:
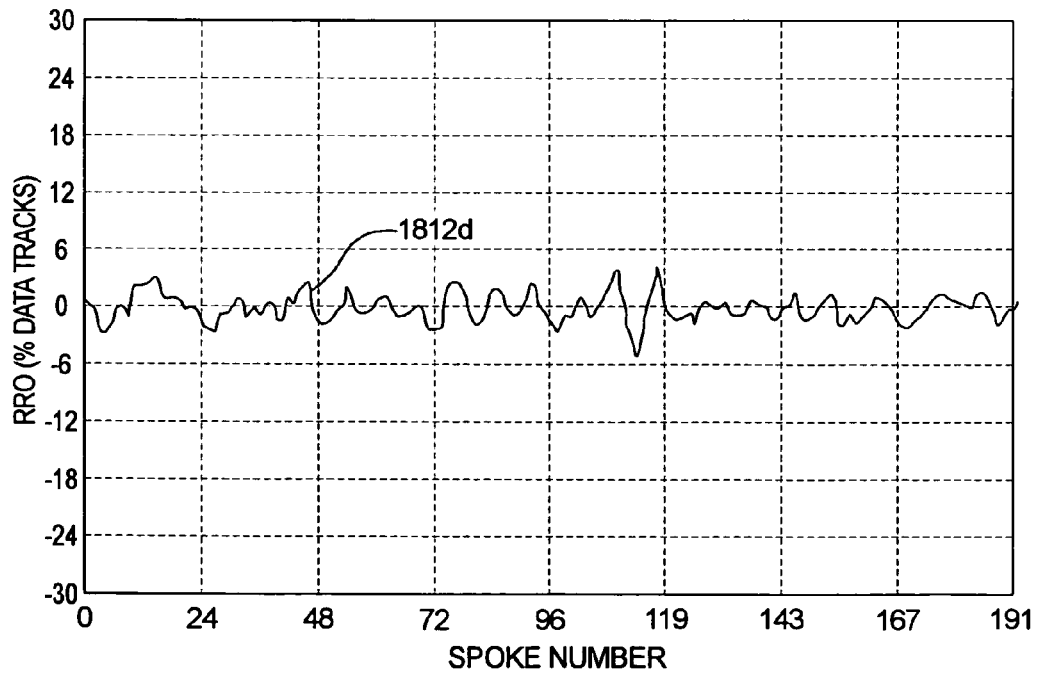
Figure 18E:
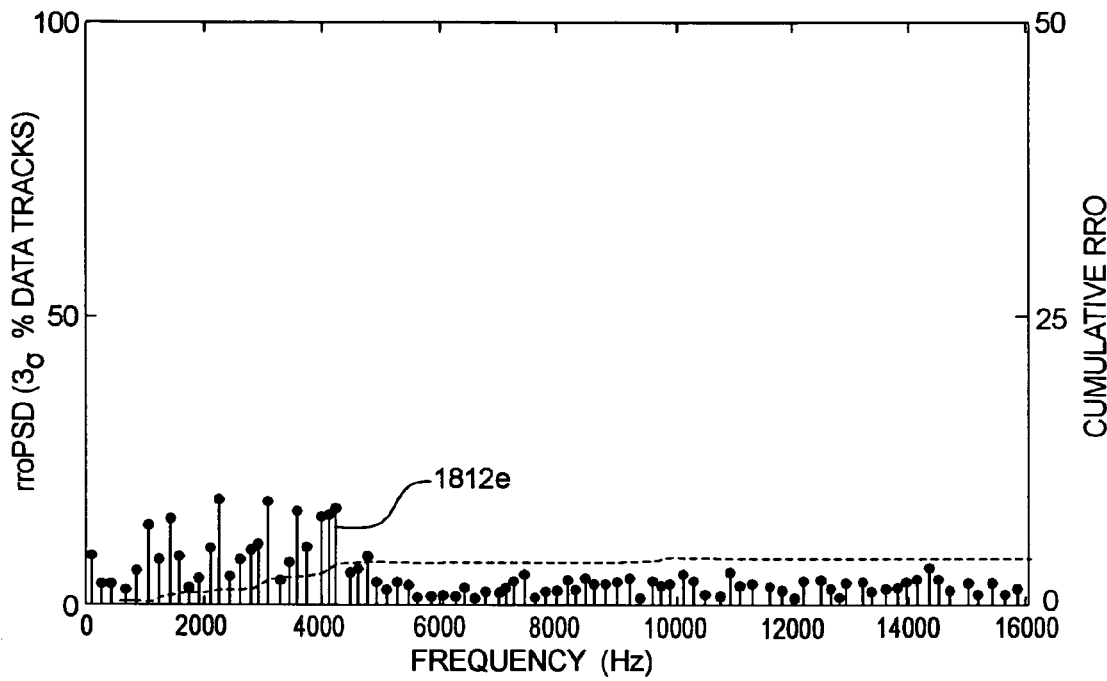
Figure 18F:
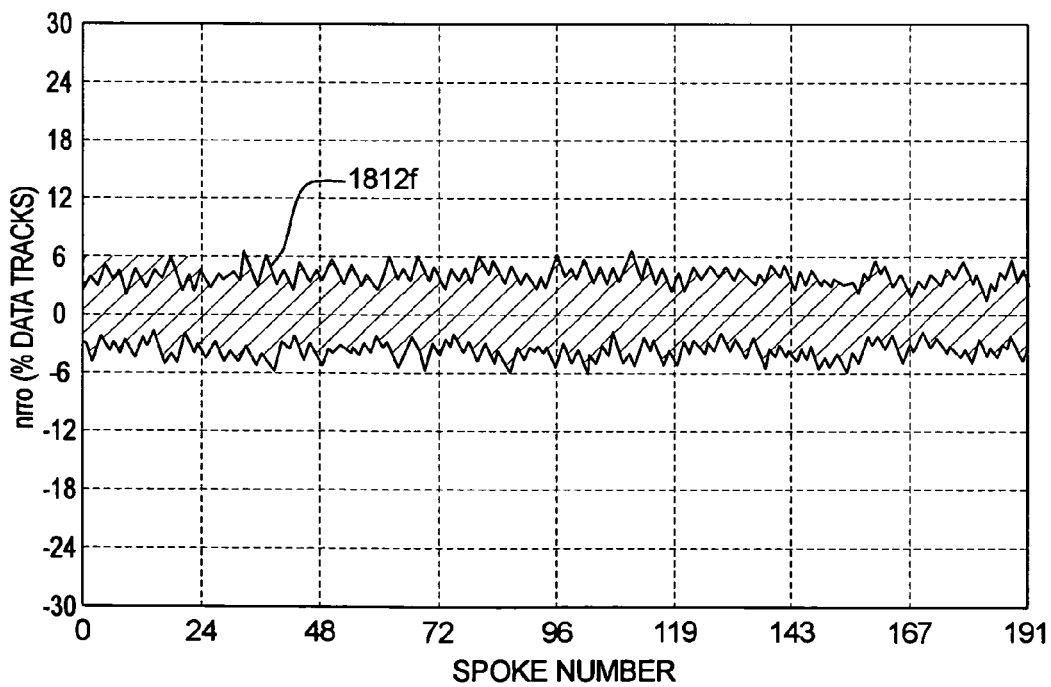
Figure 18G:
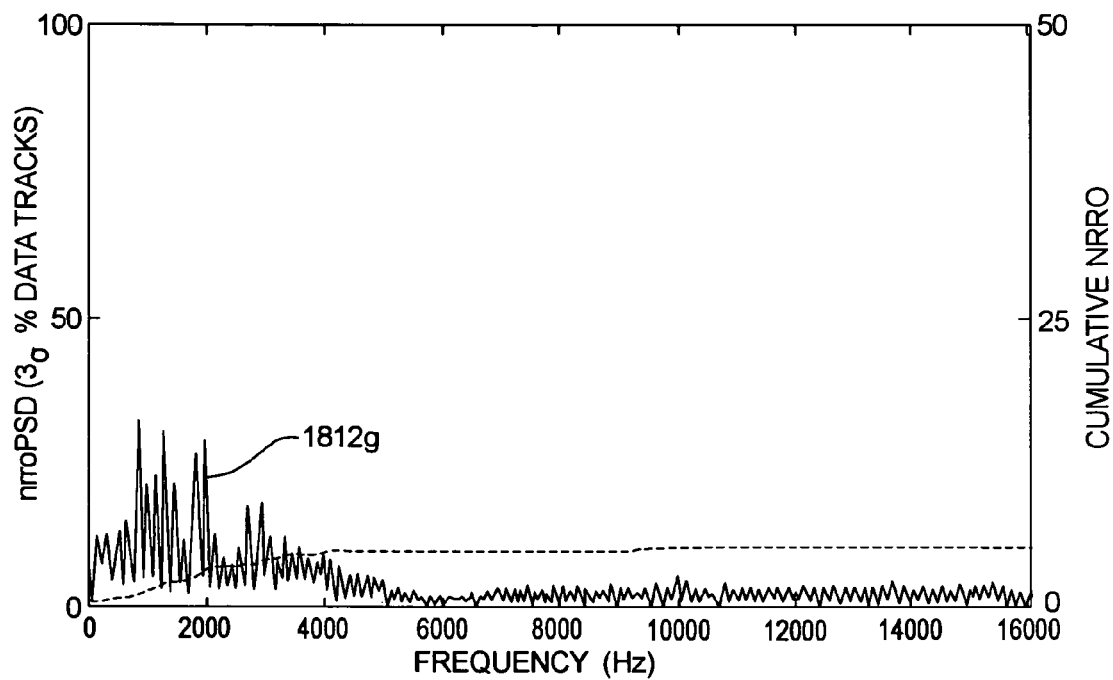
Figure 18H:
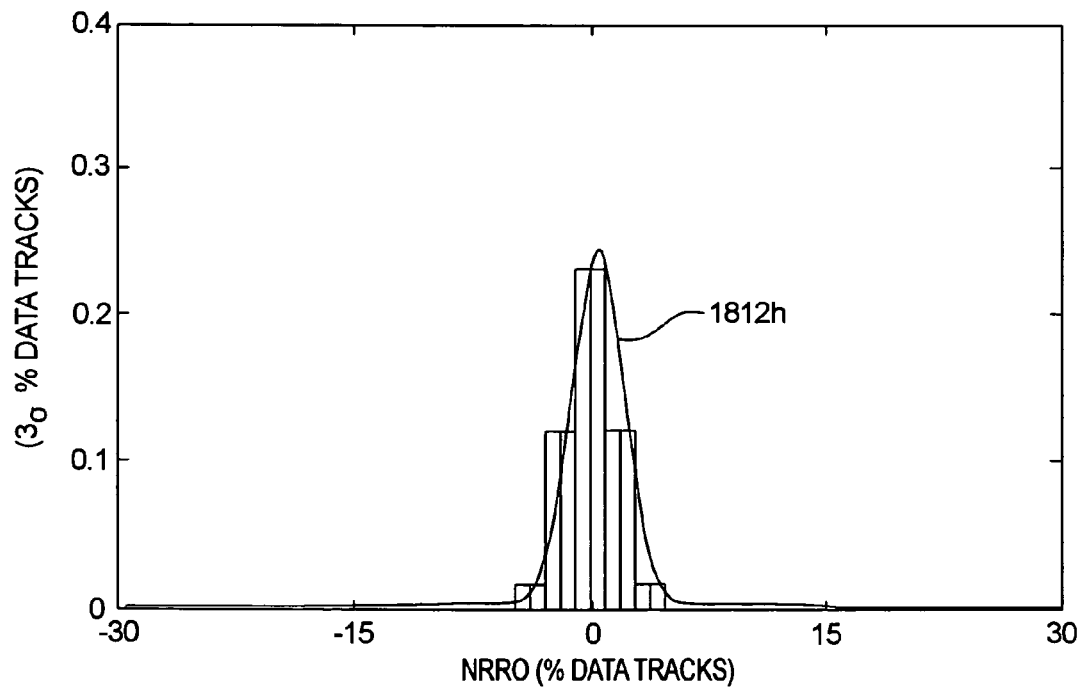
Figure 19:
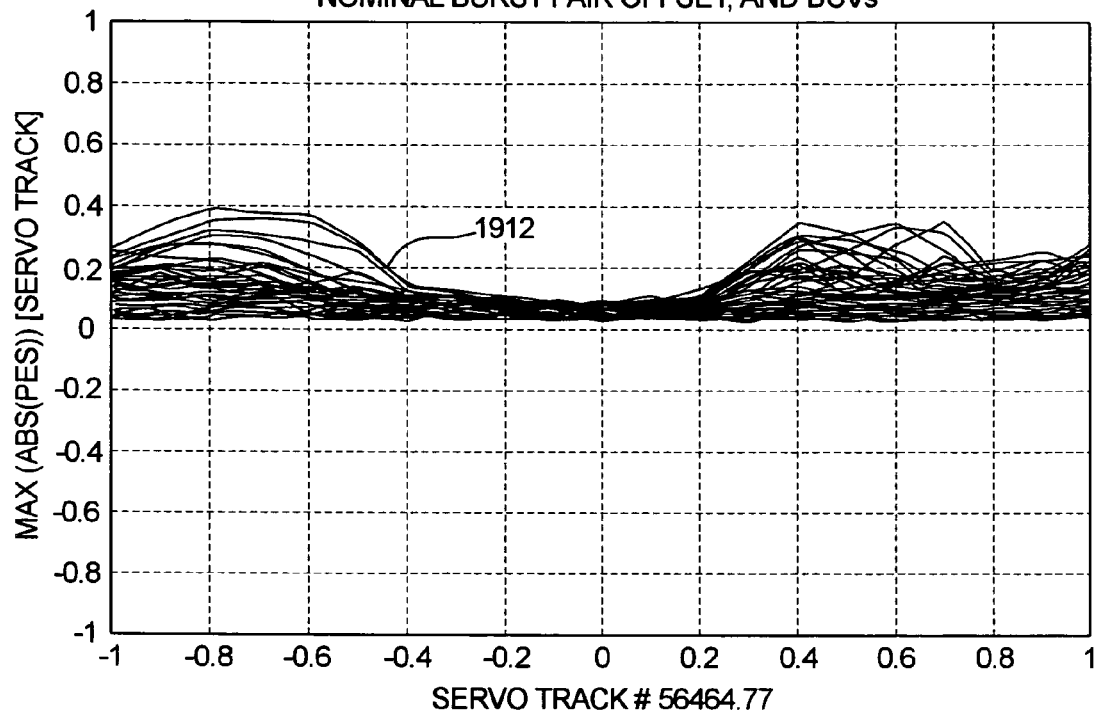
FIG. 19 is a graph with a plurality of graph lines, each line representing peak TMR at one of the spokes along the track, as a function of distance off-track, when correction according to an embodiment of the present invention is used.

FIGS. 15-19 are illustrative of examples of drive performance before and after correction, according to embodiments of the present invention, are applied to a track of a disk with distorted servo bursts and squeezed track portions. Lines 1512*a-f* of FIGS. 15A-F correspond to FIGS. 4A-4F, before correction according to embodiments of the present invention are applied. FIG. 15G, line 1512*g* shows a frequency spectrum of the non-repeatable portion of error and FIG. 15H is a histogram with fitted curve 1512*h*, corresponding to FIG. 15C, but for the non-repeatable error. FIG. 15D, compared to FIGS. 15A and 15F illustrate that, without correction, there is substantial repeatable runout. The shape of the graph lines 1612 (CNP$_a$), 1614 (CNP$_b$) of FIG. 16 show null point locations (expressed in servo track units) at various spoke numbers along the track, illustrating that spokes with the greatest error are those which are squeezed. Note that TMR data in FIGS. 15A-15H refer to destination location 56464.77 in FIG. 16. The graph lines 1712, 1714 of FIGS. 17A and 17B respectively show the values of the correction factors α and β (calculated generally according to equation (8)) at various spokes along the track. The graph lines 1812*a-h* of FIGS. 18A-18H correspond generally to FIGS. 15A-H, but with correction factors using the values of FIGS. 17A and 17B (applied according to equation (8)) calculated and applied according to equation (7). By comparing FIGS. 18A-H with FIGS. 15A-H, it is seen that correction factors according to embodiments of the present invention can substantially reduce error, even in regions where the tracks are squeezed. FIG. 19 provides a plurality of graph lines, each line representing peak TMR at one of the spokes along the track, as a function of distance off-track. More significant than individual graph lines is the envelope 1912 formed by the collection of lines. The envelope 1912 illustrates that, when correction according to embodiments of the present invention are applied, the peak TMR substantially remains below 10% of a servo track (at least for this example) in the range of −20% to +20% off-track positions around the nominal track location.

In light of the above discussion a number of advantages of the present invention can be seen. The present invention can increase effective disk capacity by reducing the number of tracks which are "mapped out" of a disk, particularly where such mapping out arises from distorted servo bursts or servo burst components (e.g., components having a size or shape which significantly deviates from nominal size or shape). The present invention can increase the effective productivity, and thus profitability, of the disk drive manufacturing operation by reducing the percentage of disk drives which are deemed unsaleable owing to an excessive number of mapped-out or unusable tracks. The present invention can provide for increased accuracy of track following, even in the presence of distorted servo bursts and, if desired, can be used for repairing (or replacing) distorted bursts. The present invention can extend the effectiveness of a tracking servo system by reducing or eliminating instances in which the servo tracking system can become unstable (such as a result of an excessive gain in the servo loop). The present invention can reduce certain operating expenses of a disk drive manufacturing operation, e.g., by avoiding the need for upgrading (or otherwise using expensive) servo writer devices and procedures, even while data density of disks or similar perimeters are upgraded or improved. The present invention makes it possible to achieve desired reduction in unusable tracks without the need for making (typically expensive) hardware changes, such as by implementing the invention substantially solely by changes in firmware or other programming.

A number of variations and modifications of the invention can be used. Although embodiments of the present invention have been described in connection with a hard disk drive, there is no theoretical reason why some or all aspects of the present invention cannot be used in connection with other types of data recording systems including, e.g., "floppy" magnetic disks, compact disks (CD's), digital versa disks (DVD's) or other optical data recording systems and the like. Although the present invention has been described in the context of embodiments which provide for nominally circular data tracks, there is no theoretical reason why some or all aspects of the present invention cannot be used in connection with other track shapes, including, e.g., spiral shapes and the like.

Although the above description indicates how BPC's can be used for correcting burst responses, it is also possible to use the method to rewrite misplaced bursts. For example, after BPC's are calculated for a particular track that has a misplaced burst, the servo loop is stabilized. This allows for accurate generation of a new set of servo spokes, e.g., between the original spokes. If desired, servo procedures can then be used based on the new set of spokes. If desired, the old spokes can then be rewritten. In general, it is believed such procedure would be used advantageously performed on untrimmed burst patterns. Stopping short of rewriting tracks until the end of the servo format at the inner diameter or outer diameter would create an untrimmed track at the location where the rewriting is terminated.

The present invention, in various embodiments, includes components, methods, processes, systems and/or apparatus substantially as depicted and described herein, including various embodiments, sub-combinations, and subsets thereof. Those with skill in the art will understand how to make and use the present invention after understanding the present disclosure. The present invention, and various embodiments, includes providing the devices and processes in the absence of items not depicted and/or described herein or in various embodiments hereof, including in the absence of such items as may have been used in previous devices or processes, e.g., for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including ultimate, interchangeable and/or equivalent structures, functions, ranges or steps to those claimed, whether or not such ultimate, interchangeable and/or equivalent structures, functions, ranges or steps are disclosed herein, and without intending to publicly dedicate any patentable subject matter.

What is claimed is:

1. Apparatus, for use in connection with a data read/write device, which can avoid instability during data track following, comprising:
    a data recording disk having a plurality of tracks and having servo information, said servo information including a plurality of servo bursts having nominal sizes, wherein said plurality of servo bursts define null points;
    a head positionable near a destination location, with respect to said tracks, by a head positioning device under control of a controller;
    circuitry which:
    obtains first information indicative of characteristics of said head positioning device and characteristics of said controller;
    obtains second information indicative of repeatable runout for at least a portion of at least a first of said tracks; and,
    calculates at least a first correction value using said first information and said second information by a process which includes calculating a value indicative of change of at least a first servo burst component size from a nominal burst component size.

2. Apparatus, as claimed in claim 1 further comprising using a position of at least one of said null points to calculate said first correction value.

3. Apparatus as claimed in claim 1 wherein said first correction value is equal to at least a first proportionality value multiplied by a value indicative of said change of at least a first servo burst component size from a nominal burst component size.

4. Apparatus, as claimed in claim 1:
    wherein said servo bursts include four components;
    wherein the combination of said controller and said actuator receives at least four component values, based on responses from reading said four components; and,
    wherein said first correction value is based on at least two of said four component values.

5. Apparatus, as claimed in claim 1, wherein said circuitry controls said head positioning device using said first correction value.

6. Apparatus, as claimed in claim 1, wherein said circuitry writes a plurality of corrected servo bursts to said disk.

7. Apparatus as claimed in claim 1 wherein said first information comprises a transfer function of said controller.

8. Apparatus as claimed in claim 1 wherein said first information comprises a transfer function of said head positioning device.

9. Apparatus as claimed in claim 1 wherein said first correction value is calculated by a process which includes circularly convolving said second information with a function of said first information.

10. Apparatus as claimed in claim 1 wherein said first correction value is calculated by a process which includes calculating a value indicative of displacement of a head position at nominal null point positions.

11. Apparatus as claimed in claim 10 wherein said nominal null point positions are adjacent to one another.

12. Apparatus as claimed in claim 1, wherein reading said servo bursts produces a response curve defining slopes at various points, including said null points, and wherein said proportionality value is based on a slope of a nominal burst response substantially at one of said null points.

13. Apparatus as claimed in claim 1 wherein said first correction value is determined as a function of a change of at least a first servo burst component size from a nominal burst component size and of a distance between a destination location and a nominal null point.

14. Apparatus as claimed in claim 4:
    wherein said circuitry calculates at least a second correction value using said first information and said second information and control said head positioning device using both said first correction value and said second correction value;
    wherein said servo information includes a plurality of servo bursts having nominal positions defining null points;
    wherein reading said servo bursts produces a response curve defining slopes at various points, including said null points;
    wherein said first correction value is a function of at least a first servo burst component size from a nominal burst component size and of a distance between a destination location and a nominal null point; and,
    wherein said second correction value is a function of at least a second servo burst component size from a nominal burst component size and of a distance between a destination location and a nominal null point.

15. Apparatus, as claimed in claim 14:
    wherein said first correction value is arithmetically combined with first and second of said four component values and said second correction value is arithmetically combined with third and fourth of said four component values.

16. Apparatus, as claimed in claim 1 wherein correction values are obtained, separately for a plurality of tracks, and wherein information indicative of said correction values are stored on said disk.

17. Apparatus, as claimed in claim 1 wherein at least some tracks have a plurality of servo bursts thereon, and wherein correction values are obtained separately for at least some of said plurality of servo bursts, and wherein information indicative of said correction values are stored on said disk.

18. Apparatus, as claimed in claim 1, wherein said circuitry comprises a programmed microprocessor.

19. A method, for use in connection with a data read/write device, which can avoid instability during track following, the data read/write device having a data recording disk with servo information thereon defining a plurality of data tracks, wherein said servo information includes a plurality of servo bursts having nominal sizes, said plurality of servo bursts defining null points, and a head positionable near a destination location, with respect to said data tracks, by a head positioning device under control of a controller comprising:

obtaining first information indicative of characteristics of said head positioning device and said controller;

obtaining second information indicative of repeatable runout for at least a portion of at least a first of said tracks; and, calculating at least a first correction value as a function of a change of at least a first servo burst size from a nominal burst component size and of a distance between a destination location and a nominal null point.

20. A method, as claimed in claim 19, further comprising: controlling said head positioning device using said first correction value.

21. A method, as claimed in claim 19, further comprising: writing a plurality of corrected servo bursts to said disk.

22. A method as claimed in claim 19, wherein said first information comprises a transfer function of said controller.

23. A method as claimed in claim 19, wherein said first information comprises a transfer function of said head-positioning device.

24. A method as claimed in claim 19, further comprising: calculating said first correction value by a process which includes circularly convolving said second information with a function of said first information.

25. A method as claimed in claim 19, wherein said first information comprises a first transfer function of said controller and a second transfer function of said head positioning device and further comprising:

calculating said first correction value by circularly convolving a function of said second information with the Inverse Discrete Fourier Transform of the sum of one and a product of said first and second transfer functions.

26. A method as claimed in claim 19, further comprising: calculating said first correction value by a process which includes calculating a value indicative of displacement of a head position at nominal null point positions.

27. A method as claimed in claim 19, further comprising: providing said first correction value equal to a proportionality constant times a value indicative of said change of at least a first servo burst component size from a nominal burst component size.

28. A method as claimed in claim 27 wherein reading said servo bursts produces a response curve defining slopes at various points, including said null points, and further comprising:

providing said proportionality constant based on a slope of a nominal burst response substantially at one of said null points.

29. A method as claimed in claim 19:

wherein said circuitry is further configured to calculate at least a second correction value using said first information and said second information and control said head positioning device using both said first correction value and said second correction value;

wherein said servo information includes a plurality of servo bursts having nominal positions defining null points;

wherein reading said servo bursts produces a response curve defining slopes at various points, including said null points; and further comprising:

providing said second correction value as a function of at least a second servo burst component size from a nominal burst component size and of a distance between a destination location and a nominal null point.

30. A method, as claimed in claim 29:

wherein said servo bursts include four components;

wherein the combination of said controller and said actuator receives at least four values, based on responses from reading said four components; and further comprising:

arithmetically combining said first correction values with first and second of said four values; and, arithmetically combining said second correction values with third and fourth of said four values.

31. A method, as claimed in claim 19, further comprising: obtaining said correction values separately for each of a plurality of tracks; and storing information indicative of said correction values on said disk.

32. A method, as claimed in claim 19, wherein at least some tracks have a plurality of servo bursts thereon, and further comprising:

obtaining correction values separately for at least some of said plurality of servo bursts; and, storing information indicative of said correction values on said disk.

33. Apparatus, for use in connection with a data read/write device having a data recording disk with a plurality of data tracks and servo information thereon defining a plurality of null points and a head positionable near a destination location, with respect to said data tracks, by a head positioning device under control of a controller comprising:

means for obtaining first information indicative of characteristics of said head positioning device and said controller, said first information including a first transfer function of said controller and a second transfer function of said head positioning device;

means for obtaining second information indicative of repeatable runout for at least a portion of at least a first of said tracks;

means for calculating at least a first correction value using a position of at least one of said null points to calculate said first correction value;

means for controlling said head positioning device using said first correction value to provide for stability of head positioning, even when tracks of said disk are noncoherent; and means for calculating said first correction value by circularly convolving a function of said second information with an Inverse Discrete Fourier Transform of the sum of one and a product of said first and second transfer functions.

34. Apparatus, as claimed in claim 33, further comprising: means for writing a plurality of corrected servo bursts to said disk.

35. Apparatus as claimed in claim 33, further comprising: means for calculating said first correction value by a process which includes calculating a value indicative of displacement of a head position at nominal null point positions.

36. Apparatus as claimed in claim 33, wherein said servo information includes a plurality of servo bursts having nominal sizes, said plurality of servo bursts defining null points, and further comprising:

means for calculating said first correction value by a process which includes calculating a value indicative of change of at least a first servo burst component size from a nominal burst component size.

37. Apparatus as claimed in claim 33, wherein said servo information includes a plurality of servo bursts having nominal sizes, said plurality of servo bursts defining null points, and further comprising:

means for providing said first correction value equal to a proportionality constant times a value indicative of change of at least a first servo burst component size from a nominal burst component size.

38. Apparatus as claimed in claim 37 wherein reading said servo bursts produces a response curve defining slopes at various points, including said null points, and further comprising:

means for providing said proportionality constant based on a slope of a nominal burst response substantially at one of said null points.

39. Apparatus as claimed in claim 33, wherein said servo information includes a plurality of servo bursts having nominal sizes, said plurality of servo bursts defining null points, and further comprising:

means for determining said first corrective value as a function of a change of at least a first servo burst component size from a nominal burst component size and of a distance between a destination location and a nominal null point.

40. Apparatus as claimed in claim 33:

wherein said circuitry is further configured to calculate at least a second correction value using said first information and said second information and control said head positioning device using both said first correction value and said second correction value;

wherein said servo information includes a plurality of servo bursts having a nominal size, said plurality of servo bursts defining null points;

wherein reading said servo bursts produces a response curve defining slopes at various points, including said null points; and further comprising:

means for providing said first correction value as a function of at least a first servo burst component size from a nominal burst component size and of a distance between a destination location and a nominal null point; and, means for providing said second correction value is a function of at least a second servo burst component size from a nominal burst component size and of a distance between a destination location and a nominal null point.

41. Apparatus, as claimed in claim 40:

wherein said servo bursts include four components;

wherein the combination of said controller and said actuator receives at least four values, based on responses from reading said four components; and further comprising:

means for arithmetically combining said first correction values with first and second of said four values; and, means for arithmetically combining said second correction values with third and fourth of said four values.

42. Apparatus, as claimed in claim 33, further comprising:

means for obtaining said correction values are separately for each of a plurality of tracks; and, means for storing information indicative of said correction values on said disk.

43. Apparatus, as claimed in claim 33, wherein at least some tracks have a plurality of servo bursts thereon, and further comprising:

means for obtaining correction values are separately for at least some of said plurality of servo bursts; and, means for storing information indicative of said correction values on said disk.

\* \* \* \* \*